US009542228B2

(12) United States Patent
Fujisawa et al.

(10) Patent No.: US 9,542,228 B2
(45) Date of Patent: Jan. 10, 2017

(54) IMAGE PROCESSING APPARATUS, CONTROL METHOD THEREOF AND STORAGE MEDIUM

(71) Applicant: CANON KABUSHIKI KAISHA, Tokyo (JP)

(72) Inventors: Kunimasa Fujisawa, Kawasaki (JP); Mamoru Osada, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/284,763

(22) Filed: May 22, 2014

(65) Prior Publication Data
US 2014/0366034 A1 Dec. 11, 2014

(30) Foreign Application Priority Data
Jun. 6, 2013 (JP) ................. 2013-120103

(51) Int. Cl.
| | |
|---|---|
| G06F 3/00 | (2006.01) |
| G06F 9/44 | (2006.01) |
| G06F 9/46 | (2006.01) |
| G06F 13/00 | (2006.01) |
| G06F 9/50 | (2006.01) |

(Continued)

(52) U.S. Cl.
CPC ............ G06F 9/5016 (2013.01); G06F 9/445 (2013.01); G06F 11/34 (2013.01); G06F 2209/504 (2013.01); Y02B 60/142 (2013.01)

(58) Field of Classification Search
CPC .................................. G06F 9/5016
USPC ....................................... 719/310
See application file for complete search history.

(56) References Cited

U.S. PATENT DOCUMENTS

| | | | | |
|---|---|---|---|---|
| 5,784,553 A | * | 7/1998 | Kolawa et al. | ............. 714/38.1 |
| 7,647,432 B2 | | 1/2010 | Sasaki et al. | |
| 2001/0001328 A1 | * | 5/2001 | Yoshida et al. | .................. 717/5 |

(Continued)

FOREIGN PATENT DOCUMENTS

| | | |
|---|---|---|
| CN | 1534467 A | 10/2004 |
| CN | 101354660 A | 1/2009 |
| JP | 2005-269439 A | 9/2005 |

OTHER PUBLICATIONS

"iR-ADV Manuals" (Canon, "Installing an Application" page, "Using an Application" page (viewed on May 17, 2013)), Internet <URL: http://cweb.canon.jp/manual/ir-adv/>.

(Continued)

Primary Examiner — Timothy A Mudrick
(74) Attorney, Agent, or Firm — Fitzpatrick, Cella, Harper & Scinto

(57) ABSTRACT

To accomplish this, an image processing apparatus, in response to a start-up request for an application, reads a class file of a class of the application, adds, at the beginning of a method included in the read class file, code for recording application information indicating the application to a thread, and loads the class. Furthermore, the image processing apparatus, during execution of the method included in the read class file, allocates memory or a file size to be used for an object to be generated and records application information recorded in the thread to the allocated memory or file size, together with generating the object and managing application information of the generated object, in association with memory size or disk usage.

12 Claims, 24 Drawing Sheets

(51) Int. Cl.
*G06F 9/445* (2006.01)
*G06F 11/34* (2006.01)

(56) References Cited

U.S. PATENT DOCUMENTS

2004/0199908 A1* 10/2004 Yoshida et al. ............... 717/162

OTHER PUBLICATIONS

Chinese Office Action dated Nov. 4, 2016 in Chinese Application No. 201410251275.2.

* cited by examiner

FIG. 4
- Bundle-Name : Application A ~401
- Application-Id : 11-1111-1111 ~402
- MaximumMemoryUsage : 2000KB ~402

FIG. 5

| 501 | 502 |
|---|---|
| APPLICATION ID | CLASS LOADER |
| 11-1111-1111 | App1Calssloader |
| 22-2222-2222 | App2Calssloader |
| 33-3333-3333 | App3Calssloader |

APP CLASS LOADER TABLE
310

| 503 | 504 |
|---|---|
| APPLICATION ID | USED MEMORY |
| 11-1111-1111 | 500KB |
| 22-2222-2222 | 100KB |
| 33-3333-3333 | 2000KB |

USED MEMORY TABLE
313

FIG. 18

| APP ID | MAXIMUM USED MEMORY |
|---|---|
| 11-1111-1111 | 2000KB |
| 22-2222-2222 | 1000KB |
| 33-3333-3333 | 3000KB |

USED MEMORY AMOUNT DECLARATION TABLE
1701

FIG. 21

| 2101 | 2102 |
|---|---|
| APPLICATION ID | USAGE |
| 11-1111-1111 | 20124KB |
| 22-2222-2222 | 128KB |
| 33-3333-3333 | 10968KB |

USED DISK TABLE
2002

| 2201 | 2202 |
|---|---|
| APPLICATION ID | MAXIMUM USAGE |
| 11-1111-1111 | 25000KB |
| 22-2222-2222 | 512KB |
| 33-3333-3333 | 12480KB |

USED DISK AMOUNT DECLARATION TABLE
2003

FIG. 22

Bundle-Name : Application A —401
Application-Id : 11-1111-1111 —402
MaximumMemoryUsage : 2000KB —402
MaximumFilespaceUsage : 25000KB —2301

IMAGE PROCESSING APPARATUS, CONTROL METHOD THEREOF AND STORAGE MEDIUM

BACKGROUND OF THE INVENTION

Field of the Invention

The present invention relates to an image processing apparatus that operates a plurality of applications, a control method thereof, and a storage medium.

Description of the Related Art

An increasing number of current multifunction peripherals (MFPs) have a function of executing applications, apart from functions incorporated in MFPs, such as copying, scanning and printing of documents. Many MFPs have a Java execution environment as an application execution environment, and are able to execute applications written in Java (registered trademark). Exemplary application execution environments include MEAP (registered trademark) developed by Canon (registered trademark).

Whereas applications are executed with one process per application in the case of Java applications on a PC, many MFPs execute a plurality of applications with one Java process using an OSGi framework or the like because of CPU or memory restrictions. Thus, when a bug in one of the applications being executed on an MFP results in a memory leak, an OutOfMemoryError could occur, causing all the applications to stop. Also, an OutOfMemoryError occurs in the case where there is no memory to allocate when an application requests memory, and thus may occur during execution of an application that is running smoothly. Thus, it is difficult to specify the application that is causing the memory leak.

Japanese Patent Laid-Open No. 2005-269439 proposes a technology for measuring memory every thread. However, in a case such as where one thread executes the codes of a plurality of applications as shown in FIG. 13 discussed later, the used memory for each application cannot be measured.

At present, the following two methods are conceivable in order to find a memory leak. One method involves using a tool called a profiler to monitor the state of objects generated by applications. The other method involves dumping the contents of heap memory that is used by a Java VM (hereinafter, "heap dumping") and analyzing objects generated by applications.

Of these methods, since monitoring the state of objects using a profiler greatly reduces the execution speed of applications, application to an MFP in which the CPU or memory is very restricted is problematic. Thus, the technique of executing heap dumping and analyzing objects generated by applications has been used. Similarly, disk capacity available for use as the application execution environment is predetermined in some cases. In the case of Disk Full, the situation is not automatically restored even when the MFP is restarted, unlike a memory leak. Thus, a technology in which applications declare usage in advance and installation restrictions are implemented so as to not exceed this usage is disclosed in "iR-ADV Manuals" (Canon, "Installing an Application" page, "Using an Application" page (viewed on May 17, 2013), Internet <URL: http://cweb.canon.jp/manual/ir-adv/>.

However, the following problems exist with the above conventional technologies. With conventional heap dumping, acquired heap dumping information is taken from the device and analyzed to locate the application causing the memory leak, and the amount of memory that is used by applications is aggregated. Thus, the memory usage of individual applications cannot be known in real-time. On the other hand, with the profiler, since the execution speed of the applications drops off greatly, realistically it is difficult to measure the memory amount that is used by each application in real-time.

Even in the case where the applications declare disk usage in advance and installation restrictions are implemented so as to not exceed this usage, one of the applications being executed on the MFP could have a bug and the entire application execution environment could be placed in a disk full state. In this case, a write error occurs even in the bug-free applications, and normal operations may no longer be possible.

SUMMARY OF THE INVENTION

The present invention enables realization of a mechanism for measuring the usage of a memory or a disk that is used by individual applications in real-time while maintaining performance.

One aspect of the present invention provides an image processing apparatus for executing a plurality of applications, comprising: a control unit configured to, in response to a start-up request for an application, read a class file of a class of the application, add, at a method included in the read class file, code for recording application information indicating the application to a thread, and load the class; an object generation unit configured to, during execution of the method included in the read class file, allocate memory to be used for an object to be generated, and generate the object with recording the application information recorded in the thread to the allocated memory; and a memory management unit configured to manage the application information of the object generated by the object generation unit, in association with memory size.

Another aspect of the present invention provides an image processing apparatus for executing a plurality of applications, comprising: a control unit configured to, in response to a start-up request for an application, read a class file of a class of the application, add, at a method included in the read class file, code for recording application information indicating the application to a thread, and load the class; an object generation unit configured to, during execution of the method included in the read class file, allocate a file size to be used for an object to be generated and record application information recorded in the thread with the allocated file size as disk usage, together with generating the object; and a disk management unit configured to tie together and manage application information of the object generated by the object generation unit and disk usage.

Still another aspect of the present invention provides a method for controlling an image processing apparatus that executes a plurality of applications, comprising: performing, with a control unit, in response to a start-up request for an application, reading of a class file of a class of the application, addition, at a method included in the read class file, of code for recording application information indicating the application to a thread, and loading of the class; performing, with an object generation unit, during execution of the method included in the read class file, allocation of memory to be used for an object to be generated and recording of application information recorded in the thread to the allocated memory, together with generation of the object; and performing, with a memory management unit, management of application information of the object generated by the object generation unit, in association with memory size.

Yet still another aspect of the present invention provides a method for controlling an image processing apparatus that executes a plurality of applications, comprising: performing, with a control unit, in response to a start-up request for an application, reading of a class file of a class of the application, addition, at a method included in the read class file, of code for recording application information indicating the application to a thread, and loading of the class; performing, with an object generation unit, during execution of the method included in the read class file, allocation of a file size to be used for an object to be generated and recording of application information recorded in the thread with the allocated file size as disk usage, together with generation of the object; and performing, with a disk management unit, management of application information of the object generated by the object generation unit, in association with disk usage.

Still yet another aspect of the present invention provides a non-transitory computer-readable storage medium storing a computer program for causing a computer to execute the steps of the method for controlling an image processing apparatus.

Further features of the present invention will be apparent from the following description of exemplary embodiments with reference to the attached drawings.

BRIEF DESCRIPTION OF THE DRAWINGS

FIG. 4 is a manifest file.

FIG. 5 is an app class loader table and a used memory table.

FIG. 18 is a used memory amount declaration table.

FIG. 21 is a diagram showing a configuration of a used disk table 2002 and a used disk amount declaration table 2003.

FIG. 22 is a diagram showing a manifest file according to the fourth embodiment.

DESCRIPTION OF THE EMBODIMENTS

Figure 1:
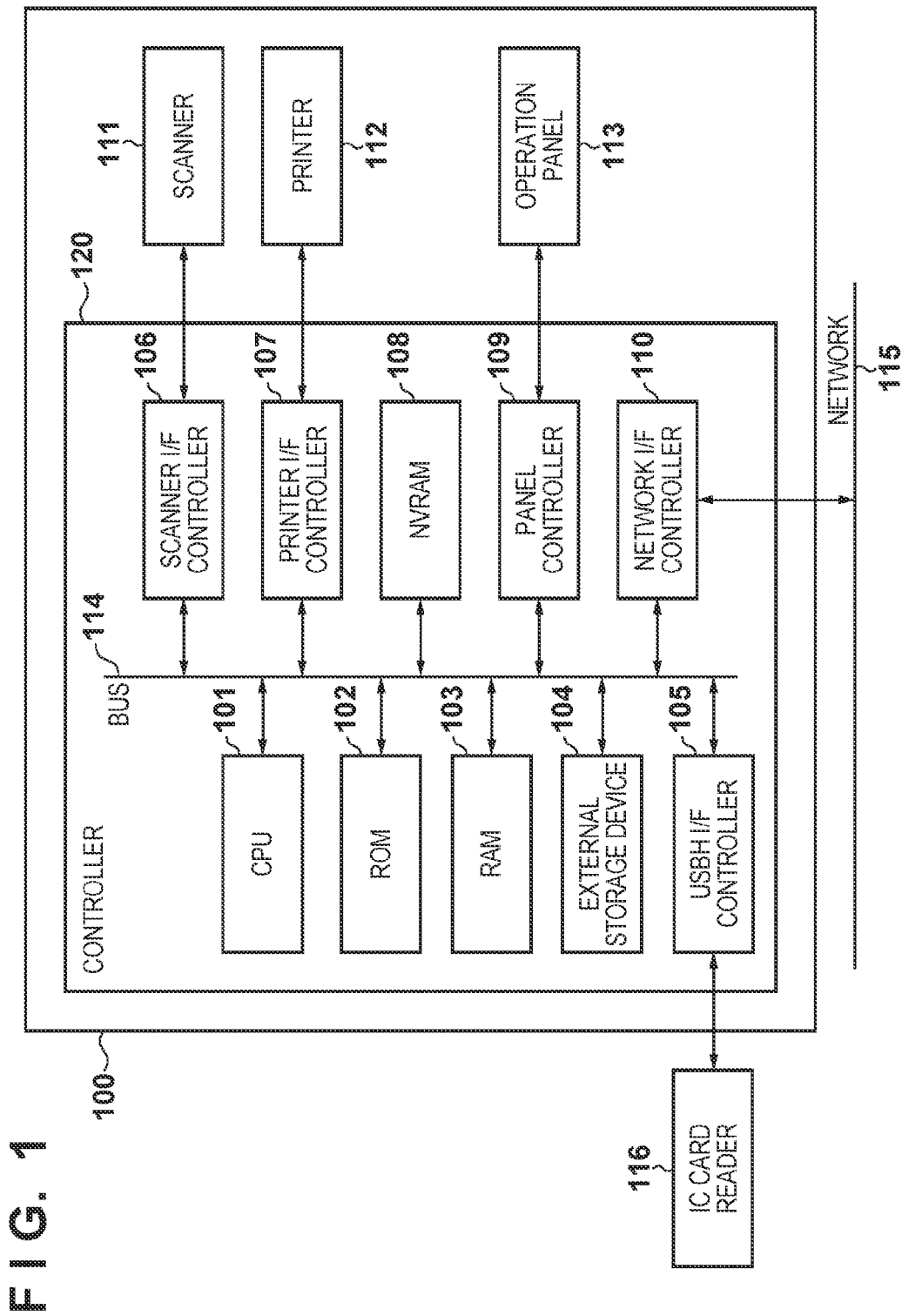
FIG. 1 is a diagram showing a configuration of an application management apparatus.

Embodiments of the present invention will now be described in detail with reference to the drawings. It should be noted that the relative arrangement of the components and the numerical expressions and numerical values set forth in these embodiments do not limit the scope of the present invention unless it is specifically stated otherwise.

First Embodiment

Configuration of Application Management Apparatus

Hereinafter, a first embodiment of the present invention will be described, with reference to FIGS. 1 to 12. First, a hardware configuration of an application management apparatus 100 will be described, with reference to FIG. 1. The application management apparatus 100 is an example of an image processing apparatus. The application management apparatus 100 is provided with a controller 120, a scanner 111, a printer 112 and an operation panel 113, and is further provided with detachable IC card reader 116. The controller 120 is provided with a CPU 101, a ROM 102, a RAM 103, an external storage device 104, a USBH I/F controller 105, a scanner I/F controller 106, a printer I/F controller 107, an NVRAM 108, a panel controller 109, and a network I/F controller 110.

The CPU 101 executes a software program of the application management apparatus 100, and performs overall control of the apparatus. The ROM 102 is a read-only memory and stores a boot program of the apparatus, fixed parameters, and the like. The RAM 103 is a random access memory, and is used for temporary data storage and the like when the CPU 101 controls the apparatus. The external storage device 104 is used for storage of various data, such as storage of installed applications, application data and print data.

The USBH I/F controller 105 is for controlling a USB host interface, and controls communication with various USB devices. The scanner I/F controller 106 is an apparatus that controls the scanner 111. The printer I/F controller 107 is an apparatus that controls the printer 112. The NVRAM 108 is a nonvolatile memory, and the various setting values of the application management apparatus 100 are saved therein.

The panel controller 109 is for controlling the operation panel 113, displaying various information, and receiving input of instructions from a user. The network I/F controller 110 controls data transmission to and reception from the network 115. The CPU 101, the ROM 102, the RAM 103, the external storage device 104, the USBH I/F controller 105, the scanner I/F controller 106, the printer I/F controller 107, the NVRAM 108, the panel controller 109 and the network I/F controller 110 are connected to a bus 114. Also, the bus 114 is a system bus over which control signals from the CPU 101 and data signal between the different apparatuses are transmitted and received. The IC card reader 116 is a USB device for performing authentication.

Software Configuration

Figure 2:
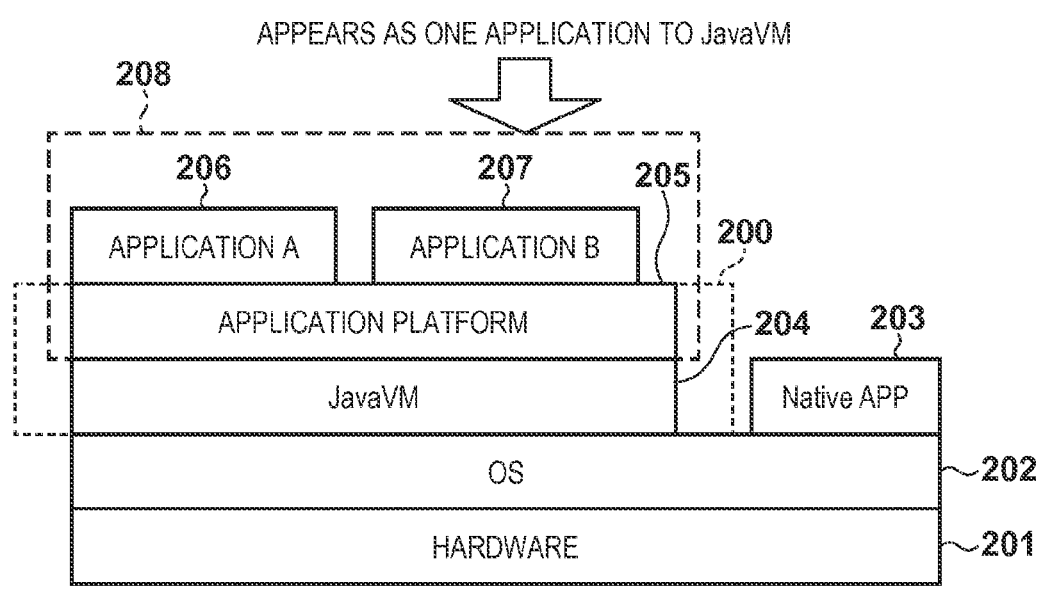
FIG. 2 is a diagram showing a software configuration of the application management apparatus.

Next, an example of software 200 of the application management apparatus 100 will be described, with reference to FIG. 2. Hardware 201 executes software of the application management apparatus. An OS 202 executes management of processes, memory management, and input-output management. A native application 203 is a program that realizes the basic functions of the device, such as a copy and the like.

The software 200 of the application management apparatus 100 is constituted by a Java VM 204 and an application platform 205. The Java VM 204 is a virtual machine that executes Java programs. The application platform 205 is a program that manages the lifecycle of applications, namely, the starting up, stopping, installing and uninstalling of at least one or more application programs on a single Java VM. An app A 206 and an app B 207 are application programs that operate on the application platform 205. The Java VM 204 processes the application platform 205, the app A 206 and the app B 207 as a single Java application 208.

Module Configuration

Next, an example of modules constituting the software 200 of the application management apparatus 100 of the present invention will be described, with reference to FIG. 3. The Java VM 204 is provided with a byte code execution unit 301, a memory management unit 302, a heap memory 305, and a system class loader 306.

The byte code execution unit 301 interprets and executes byte code which is Java program code. The heap memory 305 is a memory area that is managed by the Java VM 204, and holds Java objects generated by execution of Java programs. The memory management unit 302 manages memory that is used by applications. The memory management unit 302 is constituted by an object generation unit 303 and a GC execution unit 304. The object generation unit 303 generates Java objects in accordance with instructions of program code that is executed by the byte code execution unit 301. The GC execution unit 304 executes garbage collection for deleting Java objects that are no longer used, among the Java objects saved in the heap memory 305. The system class loader 306 loads classes that are managed by the Java VM 204. Usually, Java classes are first loaded by the class loader when needed, that is, when executing processing.

The application platform 205 is constituted by an application management unit 308, an application memory management unit 307, and an app class loader management unit 309. The application memory management unit 307 has a used memory table 313 for managing used memory for each app, and manages memory to be used per application. The application management unit 308 manages the lifecycle of applications, such as the installation, starting up, stopping and uninstallation of applications. The app class loader management unit 309 has an app class loader table 310, and generates and manages an app class loader for each application. The app class loaders load a class from a program file 312 of an application saved in the external storage device 104.

Manifest File

Next, the contents of a manifest file of an application will be described with reference to FIG. 4. A manifest file is a file that is included in a Jar file of an application. Information such as the following is described in the manifest file.

Bundle-Name 401 is the name of the application. Application-Id 402 is the application ID, which is a unique identifier for identifying the application. MaximumMemoryUsage 403 is the maximum memory usage available to the application. These setting items are prescribed by the application platform 205. Note that the above setting items and setting values are examples and not intended to limit the present invention, and various setting items and setting values may also be described in the manifest file apart from the above items and setting values.

Tables

Next, the app class loader table 310 and the used memory table 313 that are managed by the application platform 205 will be described, with reference to FIG. 5. The app class loader table 310 is a table in which an application ID 501 which is an identifier of an application and an app class loader 502 of the application are tied together and managed. The used memory table 313 is a table in which an application ID 503 which is an identifier of an application and a memory amount 504 currently being used by the application are tied together and managed.

Load Processing

Figure 6:
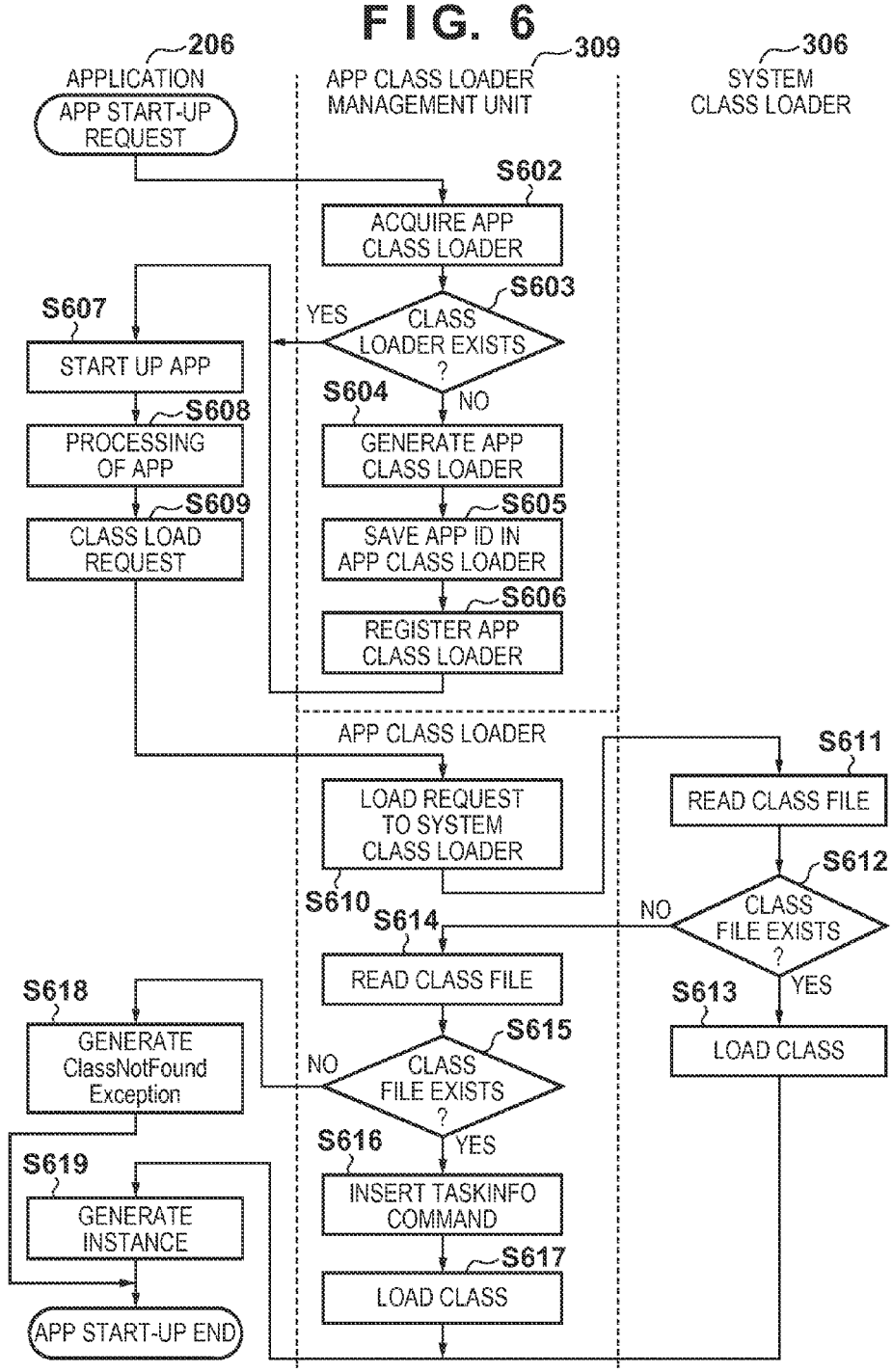
FIG. 6 is a flowchart of class load processing.

Next, the processing procedure when the application platform 205 loads a class of an application according to the present embodiment will be described, with reference to FIG. 6. The processing that is described hereinafter is realized by the CPU 101 reading out a control program stored in the ROM 102 or the external storage device 104 to the RAM 103 and executing the control program.

When a start-up request for an application is executed, the CPU 101 makes an app class loader request to the app class loader management unit 309. In S602, the app class loader management unit 309 starts acquisition of an app class loader. First, in S603, the app class loader management unit 309 determines whether a class loader corresponding to the application ID of the application with respect to which the class loader request was made exists in the app class loader table 310. The processing transitions to S607 if a corresponding class loader exists, and transitions to S604 if a corresponding class loader does not exist.

In S604, the app class loader management unit 309 generates an app class loader. Then, in S605, the app class loader management unit 309 saves an application ID for the app class loader generated at S604. Furthermore, in S606, the app class loader management unit 309 registers the app class loader generated at S604 and the application ID of the application with respect to which the class loader request was made in the app class loader table 310. Thereafter, the processing transitions to S607 and returns to the application.

If it is determined at S603 that a corresponding class loader exists or after the processing of S606, the CPU 101, in S607, starts start-up of the application 206 using the app the class loader acquired from the app class loader management unit 309. Then, the started application 206 starts generation of an application object in S608. Furthermore, the application 206, at S609, makes a class load request for an application class to the app class loader acquired from the app class loader management unit 309, in order to load the class of the application.

In S610, the application class loader, upon receiving the load request for an app class from the application 206, first requests the system class loader 306 incorporated in the Java VM to load the class. In S611, the system class loader 306, upon receiving the class load request, reads the byte code of the class file of the requested class. Then, in S612, the system class loader 306 determines whether reading of the class file is completed, and transitions to S613 if completed. On the other hand, if reading of the class file is not completed, the processing is returned to the app class loader and transitions to S614 because of a class unique to the application being loaded. In S613, the system class loader 306 loads a class based on the byte code read at S611, transitions to S619, and returns a class object to the application 206.

On the other hand, in S614, the app class loader reads the byte code of the requested class from the Jar file 312 of the app. Then, in S615, the app class loader determines whether the class file exists and reading was successful, and transitions to S616 if successful and to S618 if not successful.

In S616, the app class loader inserts TASKINFO commands into the read byte code, and, in S617, loads the class based on the byte code in which the TASKINFO commands were inserted. TASKINFO commands will be discussed in detail later using FIG. 7. Thereafter, the processing transitions to S619 and a class object is returned to the application 206.

On the other hand, if it determined at S615 that the class file does not exist, the application 206, in S618, generates a ClassNotFoundException and ends start-up of the application. In S619, the application 206 generates an instance of an application object using the class loaded at S617, and ends start-up of the app.

TASKINFO Commands

Figure 7:
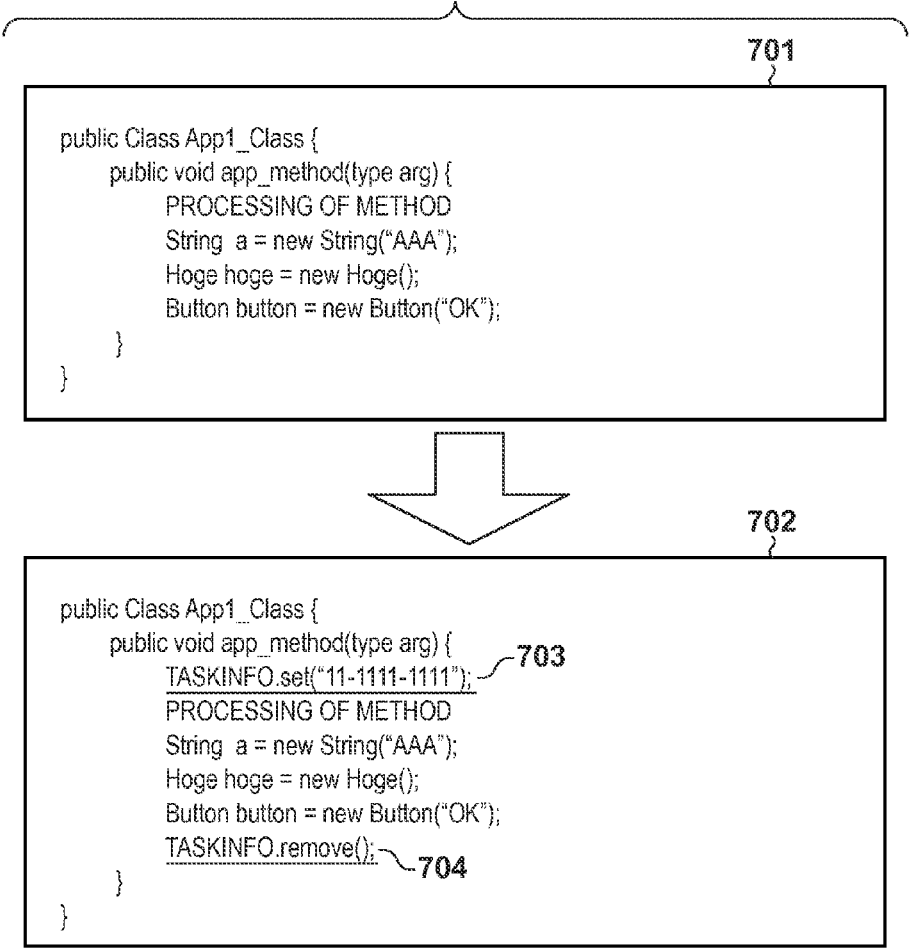
FIG. 7 is a diagram showing exemplary code to which a TASKINFO class method has been added.

Next, TASKINFO commands that are inserted in the byte code at S616 according to the present invention will be described, with reference to FIG. 7. Reference numeral 701 denotes the code before TASKINFO commands are inserted. Reference numeral 702 denotes the code after TASKINFO commands have been inserted.

As shown by reference numeral 703, "TASKINFO.set (application ID);" is inserted at the beginning of the method. Here, "11-1111-1111" is given as an exemplary application ID. The value saved in the class loader at S605 is converted to a character string and inserted as the application ID. Furthermore, as shown by reference numeral 704, "TASKINFO.remove( )" is inserted at the end of the method. The TASKINFO.set( ) method and the TASKINFO. remove( ) method will be discussed in detail later.

Thread Structure

Figure 8:
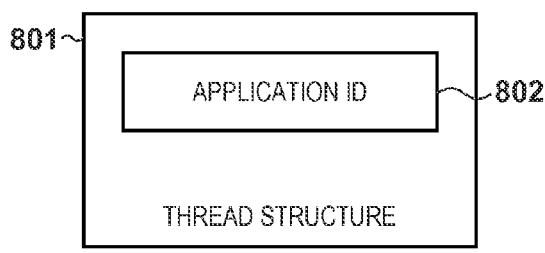
FIG. 8 is a diagram of a thread structure according to a first embodiment.

Next, the structure of a thread according to the first embodiment of the present invention will be described, with reference to FIG. 8. A structure 801 of a thread has a field 802 for storing an application ID. The field 802 is used by the TASKINFO.set( ) method and the TASKINFO. remove( ) method. Specifically, an application ID is set by the TASKINFO.set( ) method and the application ID is removed by the TASKINFO.remove( ) method.

Processing of Method

Figure 9:
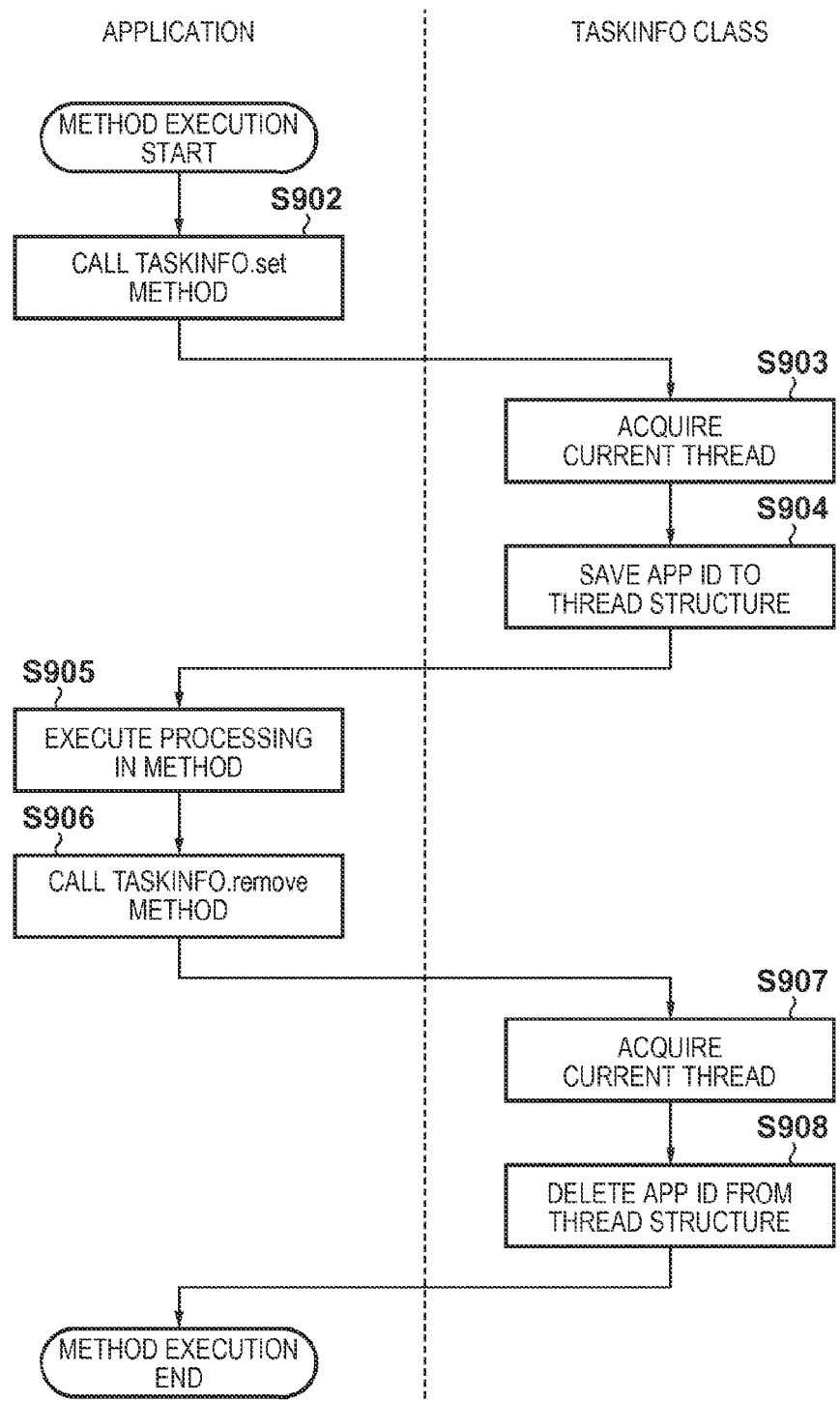
FIG. 9 is a flowchart at the time of execution of a method in which TASKINFO commands have been inserted according to the first embodiment.

Next, the processing procedure when a method in which TASKINFO commands that are included in a program of an application have been inserted is executed in the byte code execution unit 301 according to the present invention will be described, with reference to FIG. 9. The processing that is described hereinafter is realized by the CPU 101 reading out a control program stored in the ROM 102 or the external storage device 104 to the RAM 103 and executing the control program.

Upon execution of the method of the application being started, the application 206 calls the "TASKINFO.set (application ID)" at the head of the method. At this time, the application ID is added as an argument. Thereafter, the processing shifts to the set method of the TASKINFO class.

In S903, the set method of the TASKINFO class first acquires the current thread that is executing processing. Then, the set method saves the value of the application ID passed as the argument of the set method to the application ID field 802 of the thread structure acquired at S904, and returns processing to the application 206.

In S905, the application 206 executes the processing in the method of the app, and, is S906, calls "TASKINFO.remove( )" which is at the end of the method. Thereafter, the processing shifts to the remove method of the TASKINFO class.

In S907, the remove method of the TASKINFO class first acquires the current thread that is executing processing. In S908, the remove method removes the value of the application ID set in the field 802 of the thread structure of the thread acquired at S907, and returns the processing to the application. The application ends processing of the method. Application information corresponding to the thread is thereby recorded during execution of the method. Using this information, the image processing apparatus according to the present embodiment is able to ascertain memory usage in real-time.

Object Structure and Heap Memory

Figure 10:
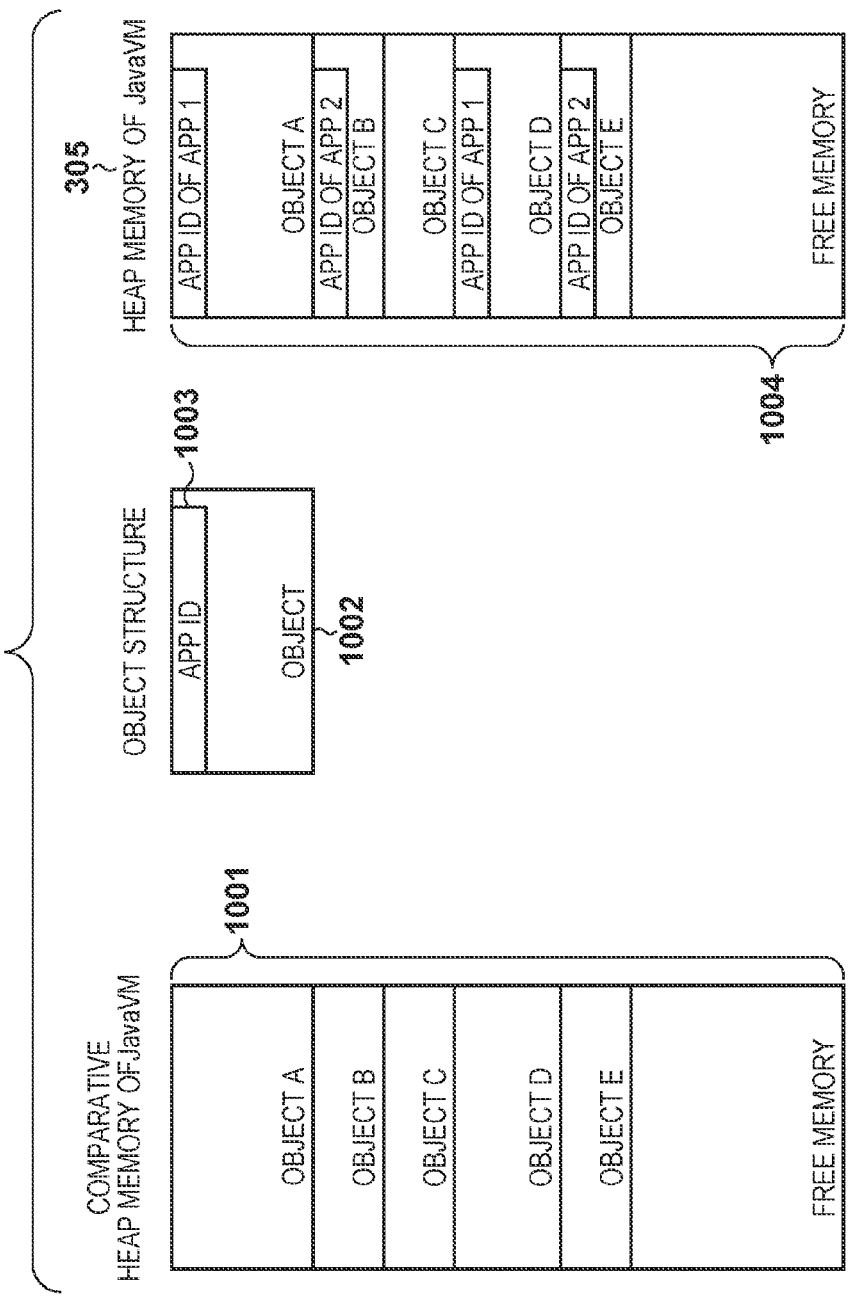
FIG. 10 is a diagram showing an object structure and a heap memory.

Next, the structure of an object of the present invention and heap memory will be described, with reference to FIG. 10. Reference numeral 1001 denotes a heap memory of a Java VM serving as a comparative example. A structure 1002 of an object according to the present embodiment differs from the heap memory 1001 in being further provided with a field 1003 for saving an application ID (application information), in addition to information unique to the object. Thus, the heap memory 305 of the Java VM 204 according to the present embodiment will be as shown by reference numeral 1004. For example, the heap memory 305 allocates areas for the structures of objects A to E, as shown in FIG. 10. The allocated areas are also respectively provided with an area for saving the application ID included in the structures. Accordingly, it can be easily checked what application an arbitrary object relates to. In FIG. 10, memory area that is not being used is represented as free memory.

Object Generation Processing

Figure 11:
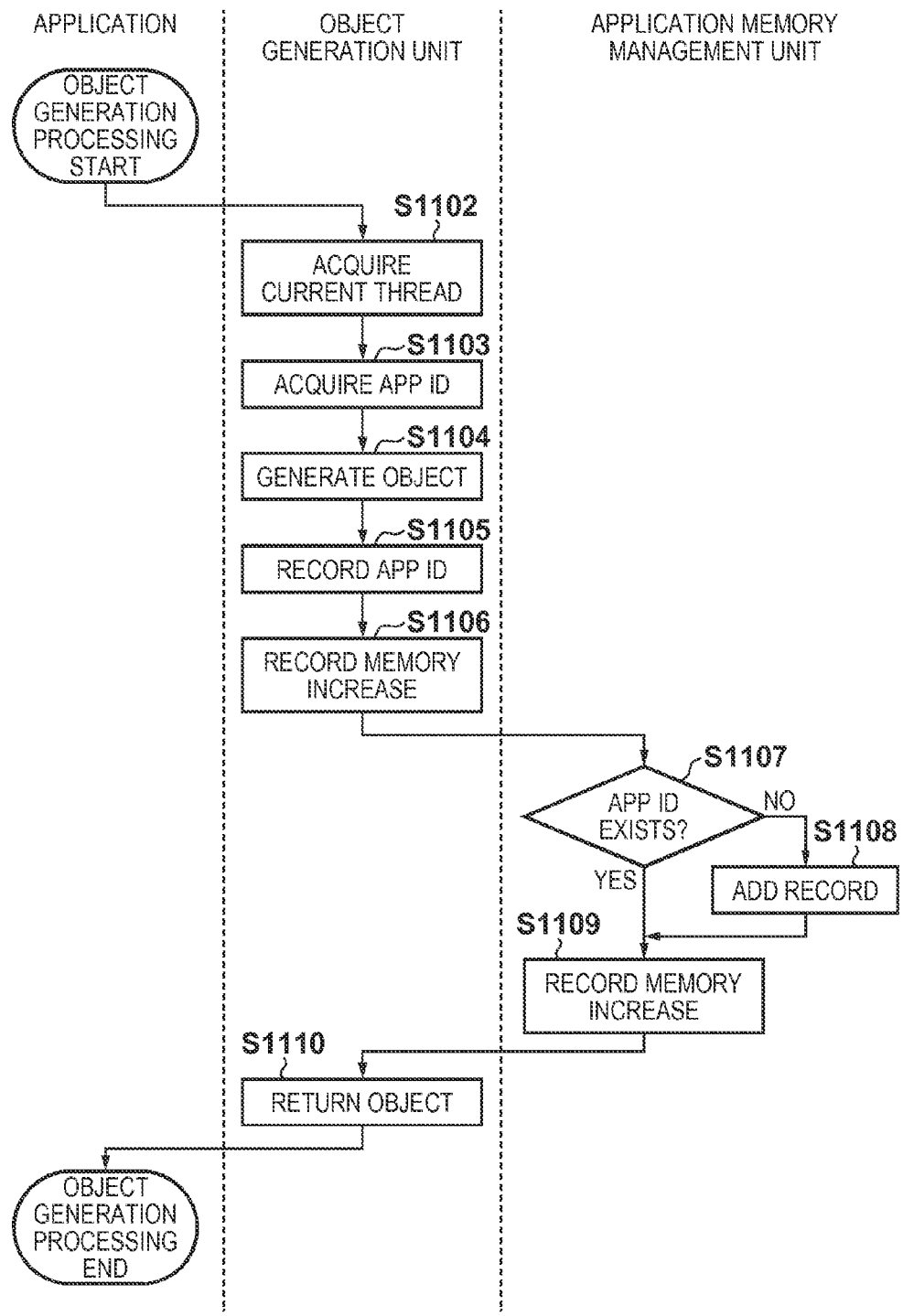
FIG. 11 is a flowchart showing object generation processing according to the first embodiment.

Next, the processing procedure of object generation processing according to the first embodiment will be described, with reference to FIG. 11. Object generation processing is executed during the processing of S905 in FIG. 9 described above. The processing that is described hereinafter is realized by the CPU 101 reading out a control program stored in the ROM 102 or the external storage device 104 to the RAM 103 and executing the control program.

The object generation processing is started upon the code of the application that will perform object generation being executed by the byte code execution unit 301, and the object generation unit 303 of the Java VM 204 is called. In S1102, the object generation unit 303 first acquires the current thread. Then, in S1103, the object generation unit 303 reads the application ID field 802 of the structure of the thread acquired at S1102, and acquires an application ID.

In S1104, the object generation unit 303 acquires memory for object generation, and generates an object. Furthermore, in S1105, the object generation unit 303 records the application ID acquired at S1103 in the application ID field 1003 of the structure of the object. In S1106, the object generation unit 303 calls the application memory management unit 307, with the application ID recorded at S1105 and the size of the object generated at S1104 as arguments, in order to record the memory increase.

In S1107, the application memory management unit 307 searches the application ID field 503 of the used memory table 313 with the application ID designated as an argument at S1106. Here, the processing transitions to S1109 if the application ID exists, and transitions to S1108 if the application ID does not exist.

In S1108, the application management unit 308 generates a new record having a used memory size of 0, registers the generated record in the used memory table 313, and transitions to S1109. In S1109, the application management unit 308 updates the value 504 of the used memory corresponding to the application ID in the used memory table 313, and returns the processing to the object generation unit 303. In S1110, the object generation unit 303 returns the generated object to the application. The application 206 receives the generated object and ends the object generation processing. In this way, the application management apparatus according to the present embodiment manages the corresponding application ID and the allocated memory size with the application memory management unit 307 when generating an object.

GC Processing

Figure 12:
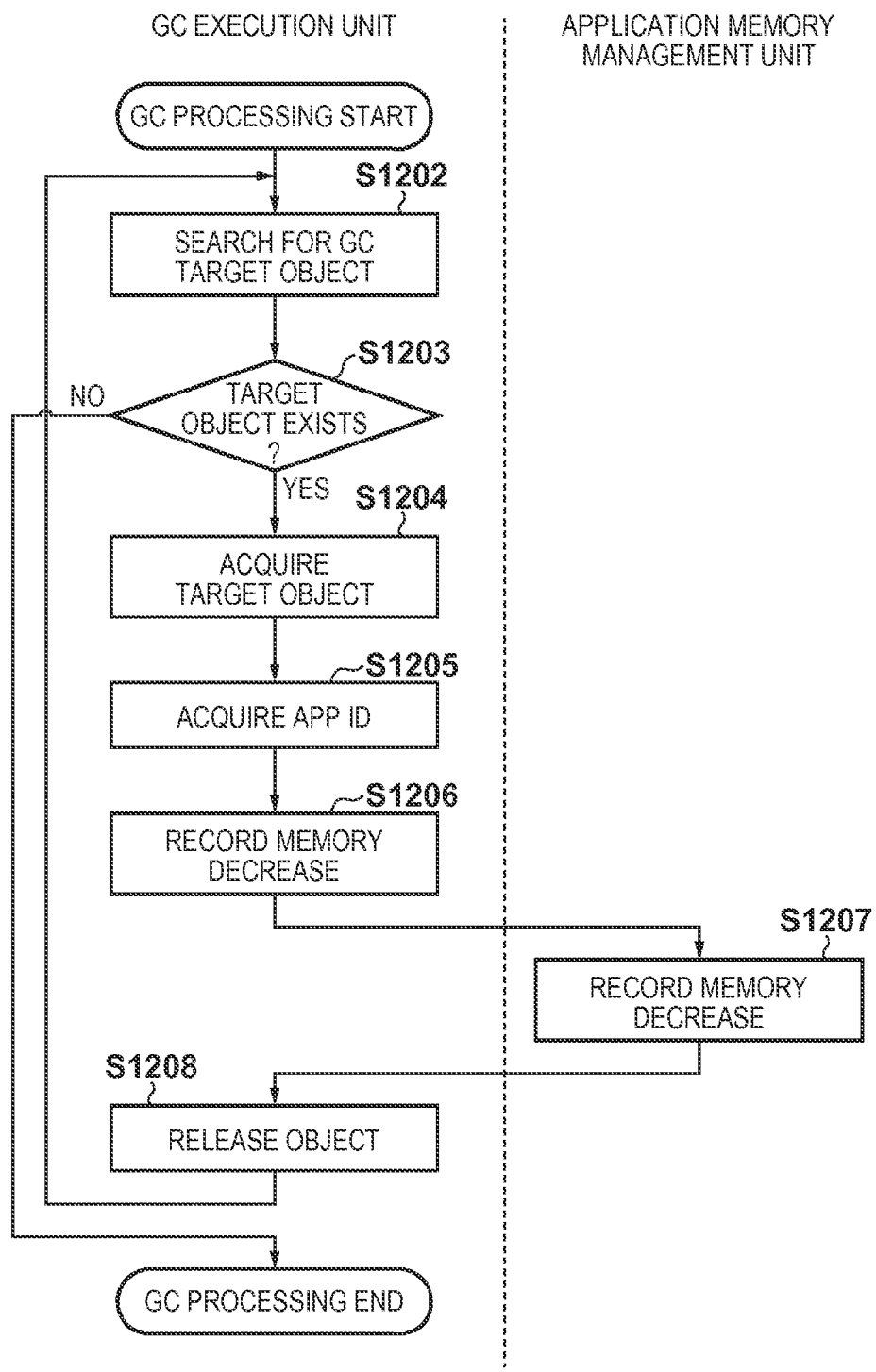
FIG. 12 is a flowchart of GC processing.

Next, the processing procedure of GC processing according to the first embodiment of the present invention will be described, with reference to FIG. 12. The Java VM 204 performs processing for increasing free memory by releasing objects that are no longer required when there is insufficient free memory for object generation. This processing is called garbage collection (GC). The processing that is described hereinafter is realized by the CPU 101 reading out a control program stored in the ROM 102 or the external storage device 104 to the RAM 103 and executing the control program.

GC processing is started by the GC execution unit 304 when there is insufficient free memory for object generation by the object generation unit 303. In S1202, the GC execution unit 304 searches the heap memory 305 for any objects that are not being referred to by anyone to be targeted for GC. In S1203, the GC execution unit 304 determines whether a target object was found. Here, the processing transitions to S1204 if a target object exists, and transitions to S1209 and is ended if a target object does not exist.

In S1204, the GC execution unit 304 acquires the contents of the target object from the heap memory 305. Then, the GC execution unit 304 acquires the value of the application ID field of the object acquired at S1204. Furthermore, in S1206, the GC execution unit 304 calls the application memory management unit 307, with the application ID recorded at S1205 and the size of the object acquired at S1204 as arguments, in order to record the memory decrease.

In S1207, the application memory management unit 307 updates the value 504 of the used memory in the used memory table 313 corresponding to the application ID designated as an argument in S1206, and returns the processing to the GC execution unit 304. When the processing returns from the application memory management unit 307, the GC execution unit 304, in S1208, releases the object, and transitions to S1202 in order to find the next object to be targeted for GC.

As described above, the image processing apparatus according to the present embodiment, in response to a start-up request for an application, reads the class file of the class of the application, adds code for recording application information indicating the application to a thread at the beginning of the method included in the read class file, and loads the class. Furthermore, this image processing apparatus, during execution of the method, allocates memory to be used for an object to be generated and records application information recorded in the thread to the allocated memory, together with generating the object and tying together and managing application information of the generated object and memory size. With this image processing apparatus, memory usage or disk usage by individual applications can thereby be measured in real-time while maintaining performance.

Second Embodiment

Hereinafter, a second embodiment of the present invention will be described, with reference to FIGS. 13 to 16. Note that, hereinafter, description of configurations and controls that are similar to the first embodiment will be omitted. Class load processing is executed similarly to the first embodiment. First, a sequence in which a plurality of applications operate cooperatively on the application platform 205 will be described, with reference to FIG. 13.

A browser 1301 is operated by an application management apparatus 100 serving as an image processing apparatus of the present invention and a device connected by a network. The device is a PC, a smart phone or a tablet. An HTTP server app 1302 is an HTTP server program that operates on the application platform 205, and has an application ID "44-4444-4444". A servlet app 1303 is a servlet-type application that operates in cooperation with the HTTP server app 1302, and has an application ID "11-1111-1111".

In S1304, the browser 1301 transmits a HTTP request to the HTTP server app 1302 through a network. Then, in S1305, the HTTP server app 1302, upon receipt of the HTTP request, generates one thread for performing HTTP request response processing, and performs HTTP request analysis processing.

If the HTTP request is for the servlet app 1303, the HTTP server app 1302, in S1306 attaches information on the HTTP request and calls the servlet app 1303. In S1307, the servlet app 1303 executes unique processing implemented by the servlet, and, at S1308, returns the processing result of the servlet to the HTTP server app 1302.

In S1309, the HTTP server app 1302 generates an HTTP response based on the received processing result of the servlet, and, at S1310, returns the HTTP response to the browser through the network. At this time, S1305 to S1309 are processed with one thread.

It is common for a plurality of applications to operate cooperatively, as shown in the diagram, on the application platform 205. Object generation is performed by HTTP request processing (S1305), servlet processing (S1307) or HTTP response processing (S1309), or all of the above. Therefore, it is necessary to discriminate whether an object was generated by the HTTP server app 1302 or the servlet app 1303.

Thread Structure

Figure 13:
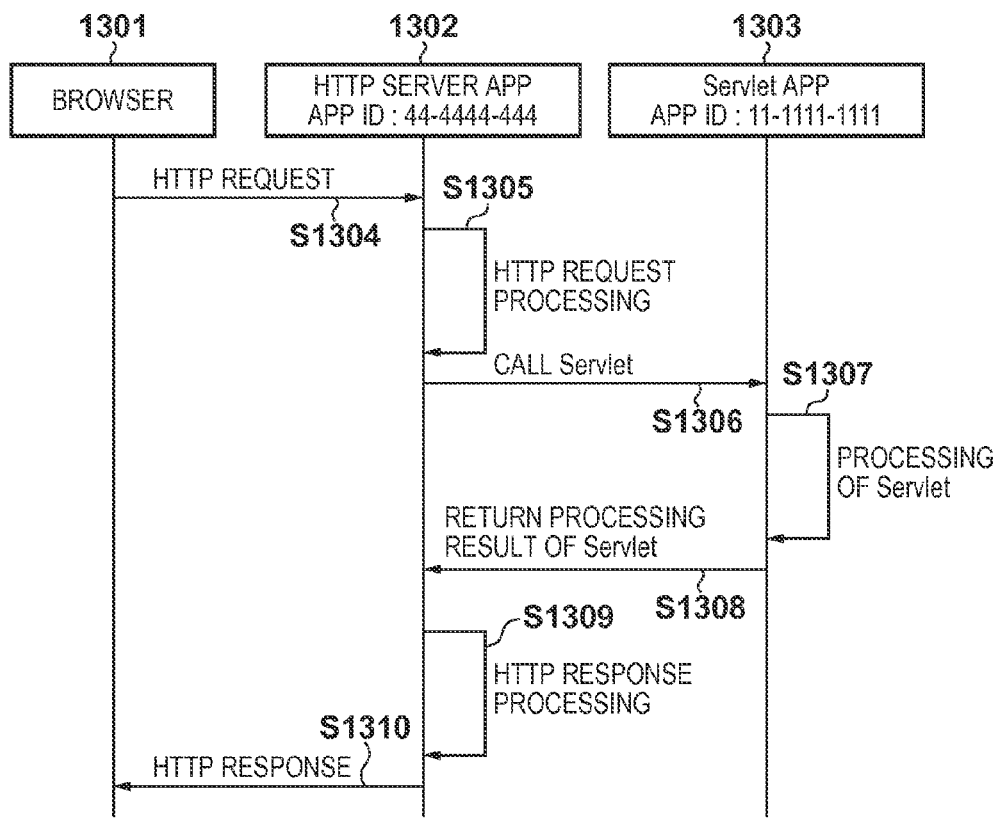
FIG. 13 is a diagram showing exemplary call processing between a plurality of applications.
Figure 14:
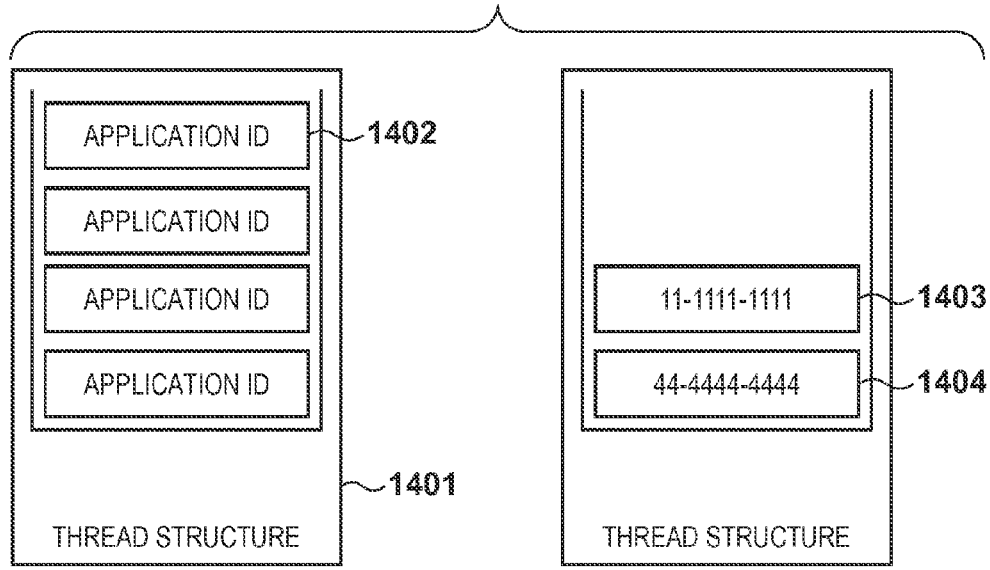
FIG. 14 is a diagram showing a thread structure according to a second embodiment.

Next, the structure of a thread according to the second embodiment of the present invention will be described, with reference to FIG. 14. A thread structure 1401 has an application ID stack 1402 as a field. When S1307, which is processing unique to the servlet, is being executed in the processing of FIG. 13, the application IDs of applications being executed are stacked. In this case, an application ID 1403 of the servlet app 1303 and an application ID 1404 of the HTTP server app 1302 are stacked in the application ID stack 1402, in order from the top.

Processing of Method

Figure 15:
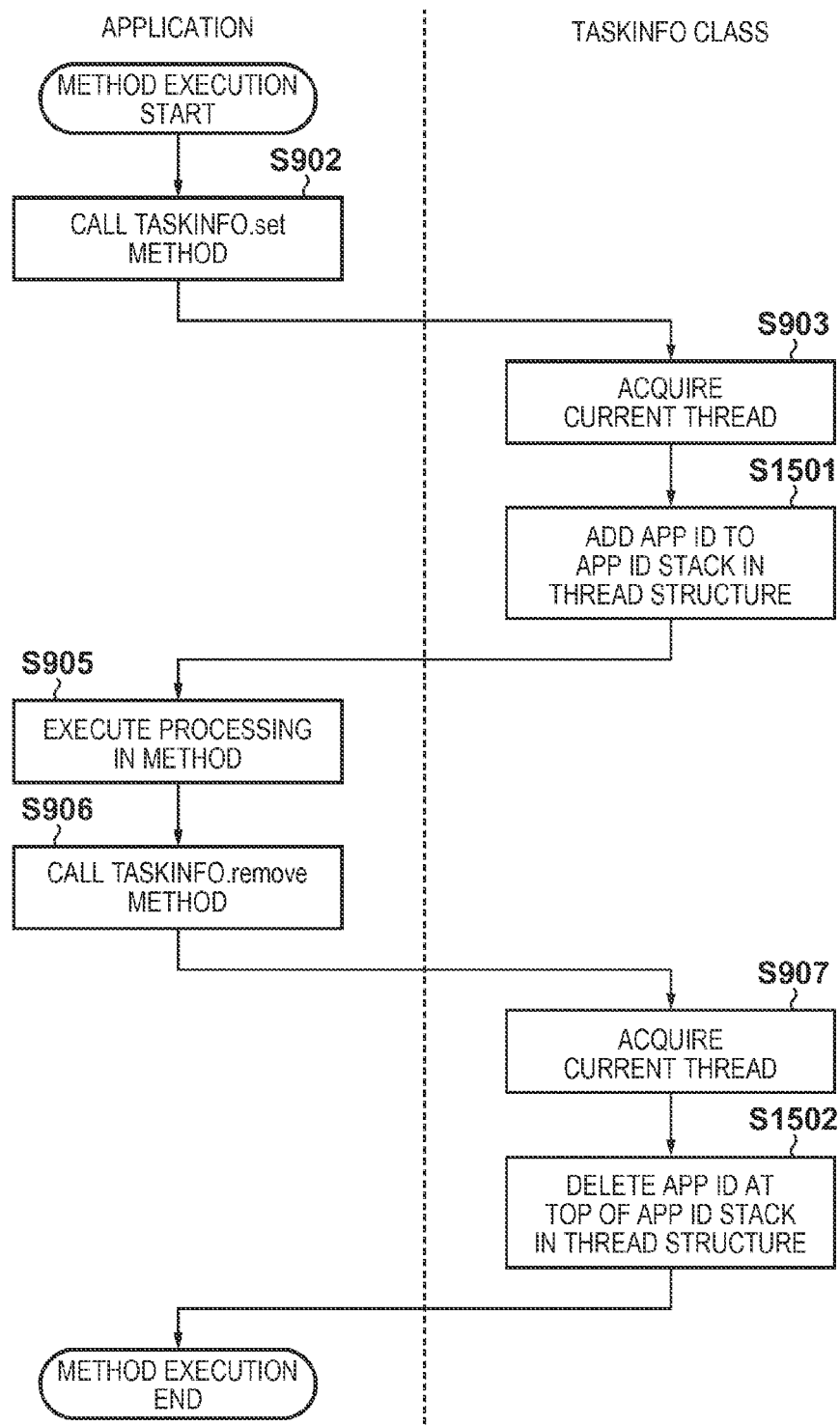
FIG. 15 is a flowchart at the time of execution of a method in which TASKINFO commands have been inserted according to the second embodiment.

Next, the processing when a method in which TASKINFO commands that are included in a program of an application have been inserted is executed in the byte code execution unit 301 according to the second embodiment of the present invention will be described, with reference to FIG. 15. The processing that is described hereinafter is realized by the CPU 101 reading out a control program stored in the ROM 102 or the external storage device 104 to the RAM 103 and executing the control program.

When execution of the method of the application is started, the application 206 calls "TASKINFO.set(application ID);" 703 which is at the head of the method, and the processing shifts to the set method of the TASKINFO class. In S903, the set method of the TASKINFO class first acquires the current thread that is executing processing. Then, in S1501, the set method adds the value of the application ID passed as an argument of the set method to the head of the application ID stack 1402 of the acquired thread structure, and returns the processing to the application.

In S905, the application 206 executes processing in the method of the application, and calls "TASKINFO.remove( )" 704 which is at the end of the method, and the processing shifts to the remove method of the TASKINFO class. In S907, the remove method of the TASKINFO class first acquires the current thread that is executing processing. Then, in S1502, the remove method deletes the application ID at the head of the stack of application IDs of the thread structure of the thread acquired at S907, and returns the processing to the application. Thereafter, the application 206 ends the processing of the method.

Object Generation Processing

Figure 16:
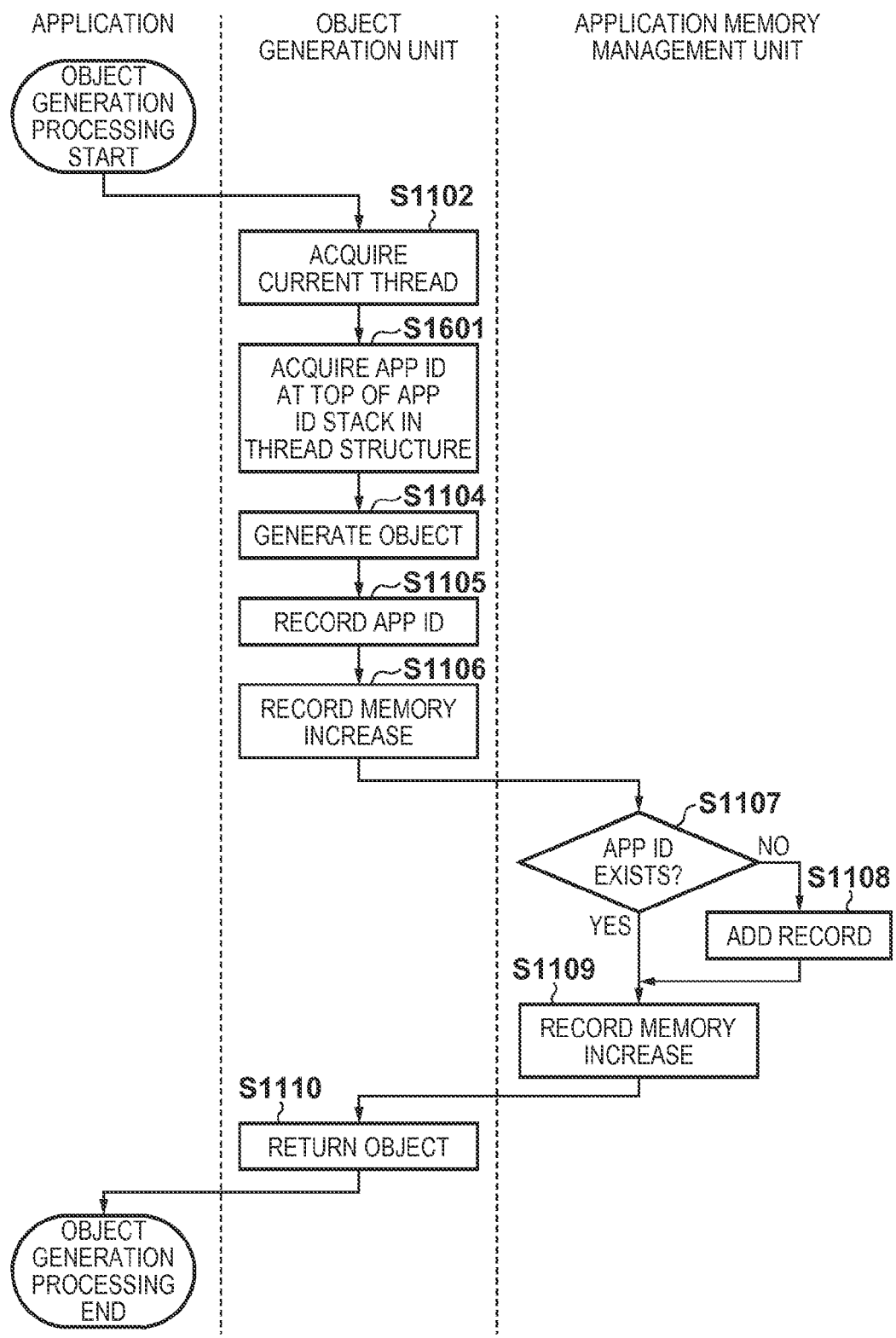
FIG. 16 is a flowchart showing object generation processing according to the second embodiment.

Next, object generation processing according to the second embodiment of the present invention will be described, with reference to FIG. 16. The processing that is described hereinafter is realized by the CPU 101 reading out a control program stored in the ROM 102 or the external storage device 104 to the RAM 103 and executing the control program. The object generation processing is started upon the code of the application that will perform object generation being executed by the byte code execution unit 301, and the object generation unit 303 of the Java VM 204 is called.

In S1102, the object generation unit 303 acquires a current thread. Then, in S1601, the object generation unit 303 acquires the application ID at the head of the stack of application IDs of the structure of the thread acquired at S1102.

In S1104, the object generation unit 303 acquires memory for object generation, and generates an object. Then, in S1105, the object generation unit 303 records the application ID acquired at S1601 in the application ID field 1003 of the structure of the object. Furthermore, in S1106, the object generation unit 303 calls the application memory management unit 307 with the application ID recorded at S1105 and the size of the object generated at S1104 as arguments, in order to record the memory increase.

In S1107, the application management unit 308 searches the application ID field 503 of the used memory table 313 with the application ID, and determines whether the application ID exists. The processing transitions to S1109 if the application ID exists, and transitions to S1108 if the application ID does not exist. In S1108, the application management unit 308 generates a new record having a used memory size of 0, registers the generated record in the used memory table 313, and transitions the processing to S1109. In S1109, the application management unit 308 updates the value 504 of the used memory corresponding to the application ID of the used memory table 313, and returns the processing to the object generation unit 303.

In S1110, the object generation unit 303 returns the generated object to the application. The application 206 receives the generated object and ends the object generation processing. Since the GC processing is similar to the first embodiment, description thereof will be omitted.

As described above, according to the present embodiment, in the case where a plurality of applications operate cooperatively, application information that is recorded in a thread will have a stack structure. Memory usage or disk usage by individual applications can thereby be measured in real-time while maintaining performance, even in a case such as shown in FIG. 13, similarly to the first embodiment.

Third Embodiment

Figure 19:
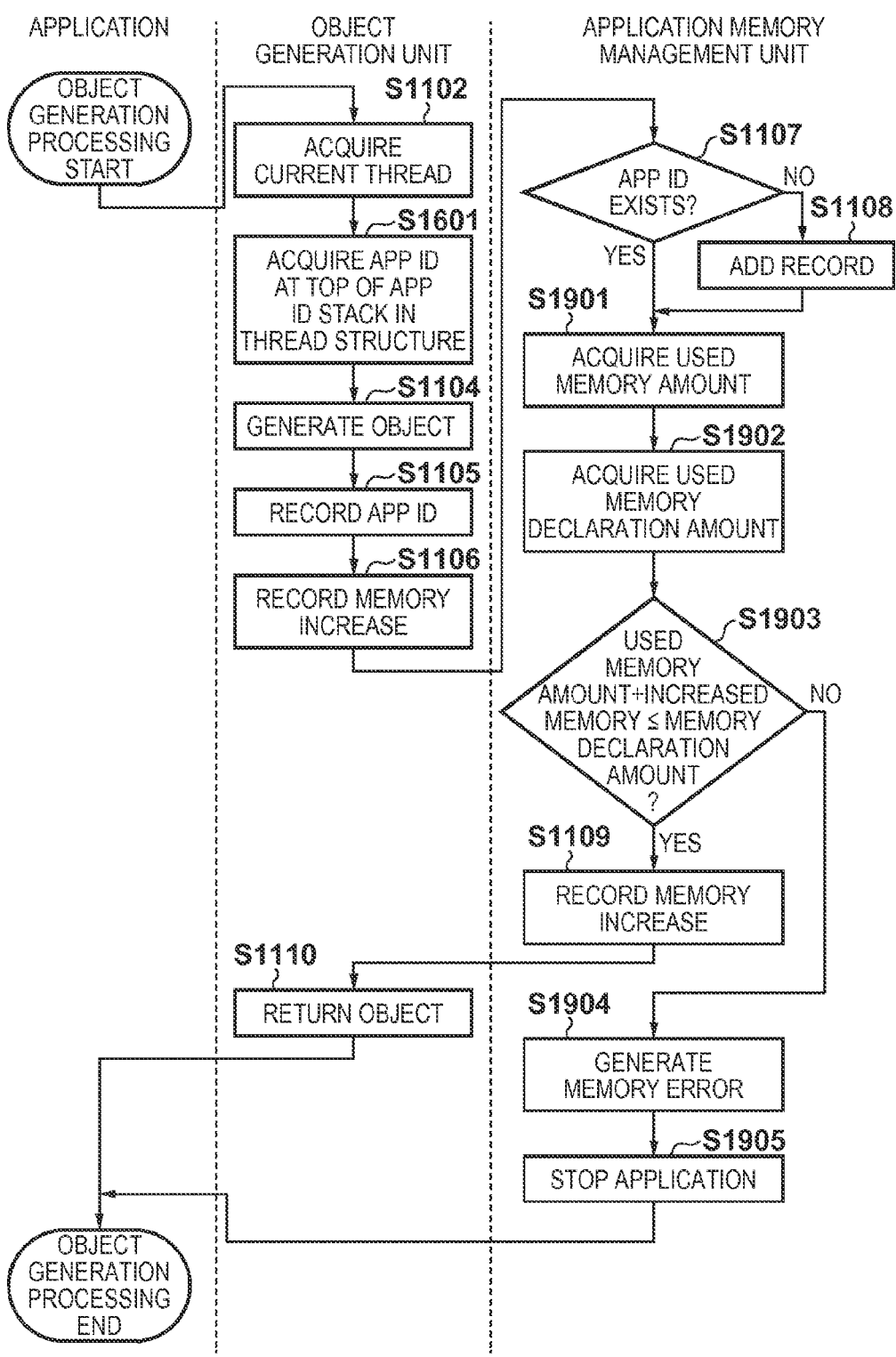
FIG. 19 is a flowchart showing object generation processing according to the third embodiment.

Hereinafter, a third embodiment of the present invention will be described, with reference to FIGS. 17 to 19. Note that, hereinafter, description of configurations and controls that are similar to the first and second embodiments will be omitted. First, an exemplary configuration of modules in the software 200 of an application management apparatus of the present embodiment will be described, with reference to FIG. 17.

Figure 3:
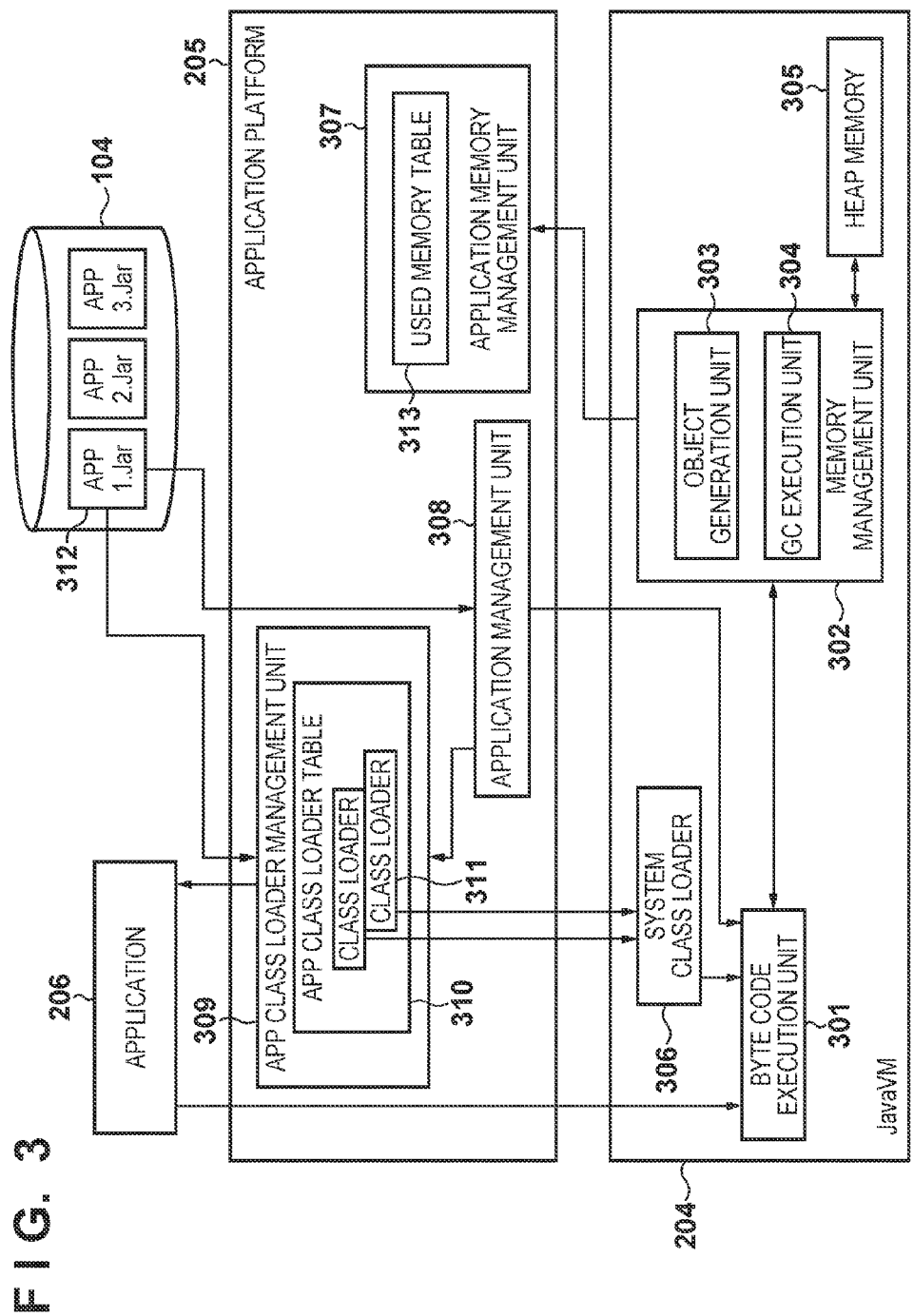
FIG. 3 is a diagram showing a module configuration of the application management apparatus.
Figure 17:
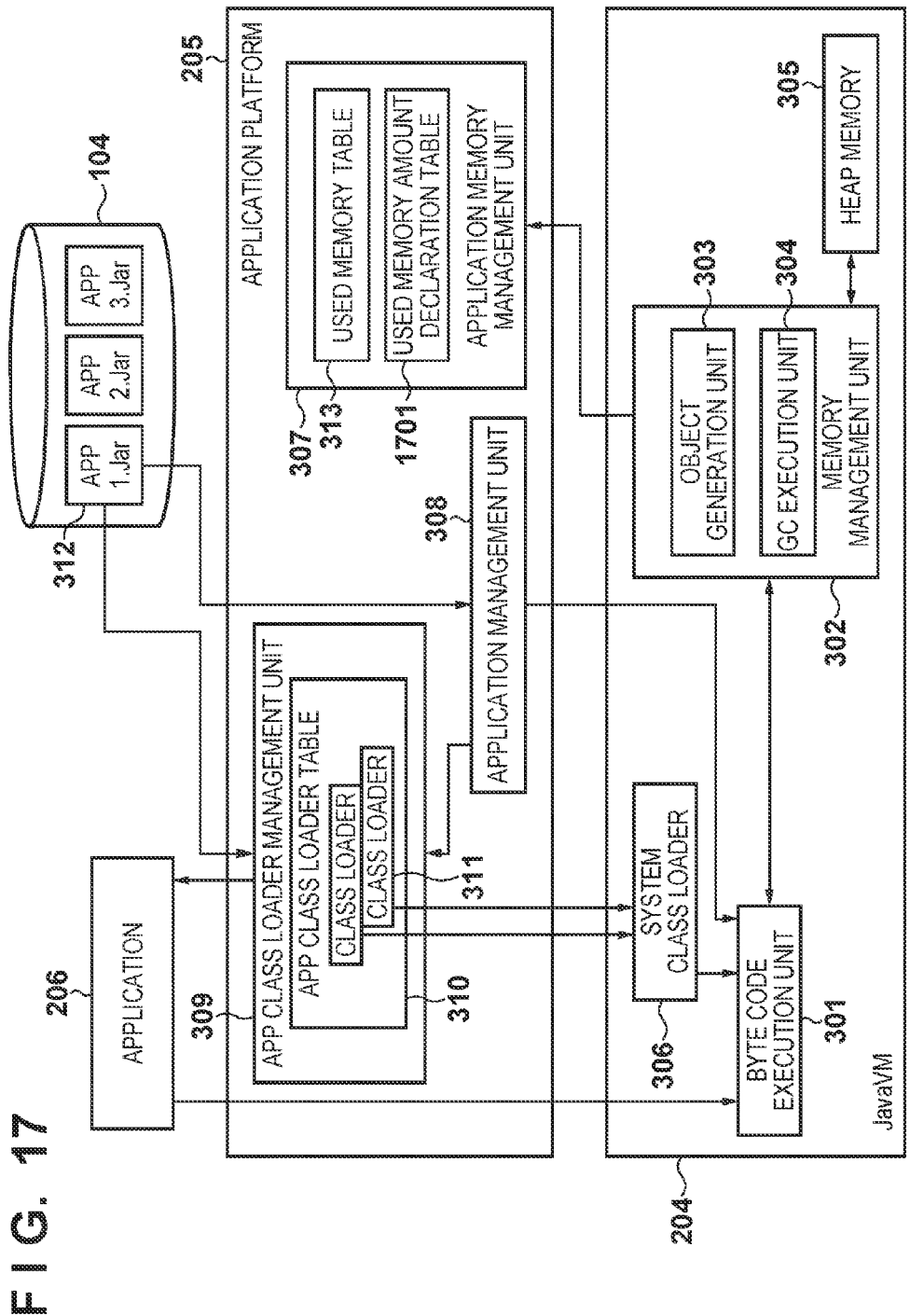
FIG. 17 is a diagram showing a configuration of an application management apparatus according to a third embodiment.

As shown in FIG. 17, the application memory management unit 307 is provided with a used memory amount declaration table 1701, in addition to the configuration illustrated in FIG. 3. Class load processing is executed similarly to the first embodiment. Processing at the time of executing a method in which TASKINFO commands have been inserted is executed similarly to the first embodiment.

Used Memory Amount Declaration Table

Next, the used memory amount declaration table 1701 will be described, with reference to FIG. 18. The used memory amount declaration table 1701 is a table in which an application ID 1801 and a maximum used memory 1802 showing the maximum amount of memory used by an application that is identified by the application ID are tied together and managed.

The maximum memory usage of the application is described in the MaximumMemoryUsage setting 403 of the manifest file of the application shown in FIG. 4. The application management unit 308 reads the Application-Id setting 402 and the MaximumMemoryUsage setting 403 from the Jar file of the application when the application is installed. Furthermore, the application management unit 308 adds the read values to the used memory amount declaration table 1701.

Object Generation Processing

Next, the processing procedure of the object generation processing according to the present embodiment will be described, with reference to FIG. 19. The processing that is described hereinafter is realized by the CPU 101 reading out a control program stored in the ROM 102 or the external storage device 104 to the RAM 103 and executing the control program.

The object generation processing is started upon the code of the application that will perform object generation being executed by the byte code execution unit 301, and the object generation unit 303 of the Java VM 204 is called. In S1102, the object generation unit 303 first acquires the current thread. Then, in S1601, the object generation unit 303 reads the application ID field 802 of the structure of the thread acquired at S1102, and acquires an application ID.

In S1104, the object generation unit 303 acquires memory for object generation and generates an object. Then, in S1105, the object generation unit 303 records the application ID acquired at S1103 in the application ID field 1003 of the object structure. Furthermore, in S1106, the object generation unit 303 calls the application memory management unit 307 with the application ID recorded at S1105 and the size of the object generated at S1104 as arguments, in order to record the memory increase.

In S1107, the application memory management unit 307 searches the application ID field 503 of the used memory table 313 with the application ID, and determines whether the application ID exists. The processing transitions to S1901 if the application ID exists, and transitions to S1108 if the application ID does not exist. In S1108, the application memory management unit 307 generates a new record having a used memory size of 0, registers the generated record in the used memory table 313, and transitions the processing to S1901.

In S1901, the application memory management unit 307 searches the application ID field 503 of the used memory table 313 with the application ID, and acquires the current used memory size.

Next, in S1902, the application memory management unit 307 searches the used memory amount declaration table 1701 with the application ID, and acquires the used memory declaration amount of the application corresponding to the application ID. In S1903, the application memory management unit 307 determines whether the sum total of the object size passed from the object generation unit 303 at S1106 and the current used memory size acquired at S1901 is less than or equal to the maximum memory usage acquired at S1902. The processing transitions to S1109 if the sum total is less than or equal to the maximum memory usage, and transitions to S1904 if the sum total exceeds the maximum memory usage.

In S1109, the application memory management unit 307 updates the value 504 of the used memory corresponding to the application ID in the used memory table 313, and returns the processing to the object generation unit 303. In S1110, the object generation unit 303 returns the generated object to the application. The application receives the generated object and ends the object generation processing.

On the other hand, when it is determined at S1903 that the sum total exceeds the maximum memory usage, the application memory management unit 307, in S1904, generates a memory error. Then, in S1905, the application memory management unit 307 requests the application management unit 308 to perform processing for stopping the application corresponding to the application ID, and returns the processing to the application. The application ends the object generation processing.

As described above, according to the present embodiment, a table defining the maximum memory usage for each application is further provided, in addition to the configuration of at least one of the first embodiment and the second embodiment. Furthermore, this image processing apparatus is able to perform control so as to stop generation of an object, in the case where the sum total of memory usage already currently being used and the allocated memory size exceeds the maximum memory usage, depending on the memory size allocated at the time of object generation.

Fourth Embodiment

Hereinafter, a fourth embodiment of the present invention will be described, with reference to FIGS. 20 to 28. In the present embodiment, an embodiment that restricts disk usage of the external storage device 104 similarly to memory, using the mechanism of the first to third embodiments will be described. Accordingly, the present embodiment can be respectively combined with the first to third embodiments. Note that, hereinafter, description of configurations and controls that are similar to the first to third embodiments will be omitted. Class load processing is executed similarly to the first embodiment. Processing at the time of executing a method in which TASKINFO commands have been inserted is executed similarly to the first embodiment.

In the present embodiment, applications installed by the application management unit 308 are stored in a predetermined directory of the external storage device 104. Also, applications are assumed to be restricted to being able to use only the capacity under the directory in which the application is itself installed.

Module Configuration

Figure 20:
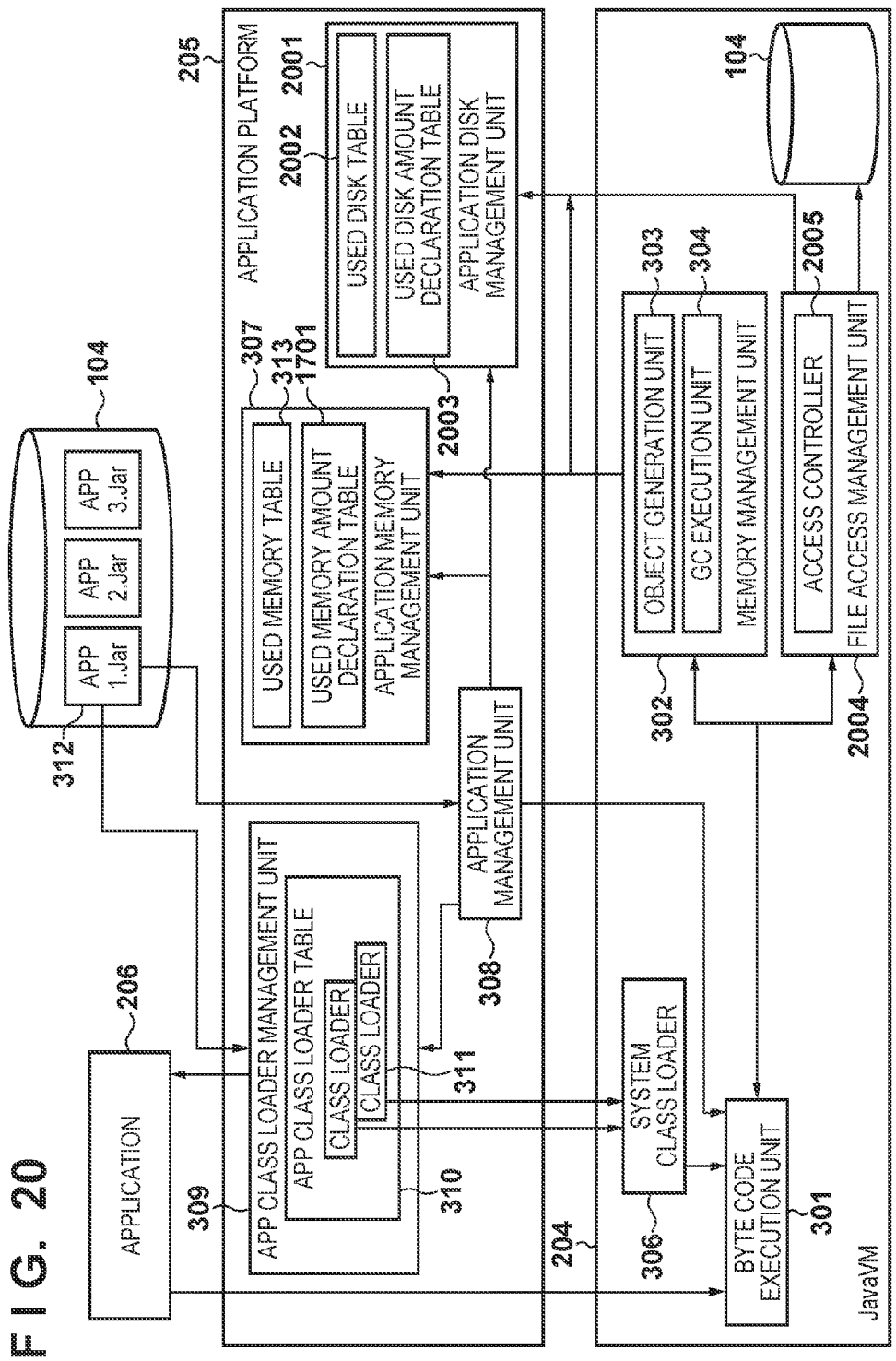
FIG. 20 is a diagram showing a configuration of an application management apparatus according to a fourth embodiment.

First, an exemplary configuration of modules in the software 200 of the application management apparatus 100 according to the present embodiment will be described, with reference to FIG. 20. In addition to the configuration of FIG. 17, the application platform 205 is provided with an application disk management unit 2001, and the Java VM 204 is provided with a file access management unit 2004.

The application disk management unit 2001 is constituted by a used disk table 2002 and a used disk amount declaration table 2003 which will be discussed later. The file access management unit 2004 is constituted by an access controller 2005, and controls file access to the external storage device 104 by the application 206.

Used Disk Table and Used Disk Amount Declaration Table

FIG. 21 shows configurations of the used disk table 2002 and the used disk amount declaration table 2003. In the used disk table 2002, an application ID 2101 and a current disk usage 2102 of a corresponding application are tied together and managed. In the used disk amount declaration table 2003, an application ID 2201 and a maximum usage 2202 of a corresponding application are tied together and managed. The used disk table 2002 and the used disk amount declaration table 2003 may be managed as a single table, and are not limited to the configuration of the present embodiment as long as equivalent information is managed.

FIG. 22 shows the contents of a manifest file of an application of the present embodiment. MaximumFilespaceUsage 2301 indicating the maximum disk usage of the application has been added to the contents shown in FIG. 4. Note that, here, the MaximumMemoryUsage setting 403 is also included, but the present invention is not limited thereto, and a configuration may be adopted in which only MaximumFilespaceUsage 2301 is included, for example.

Initialization Processing

Figure 23:
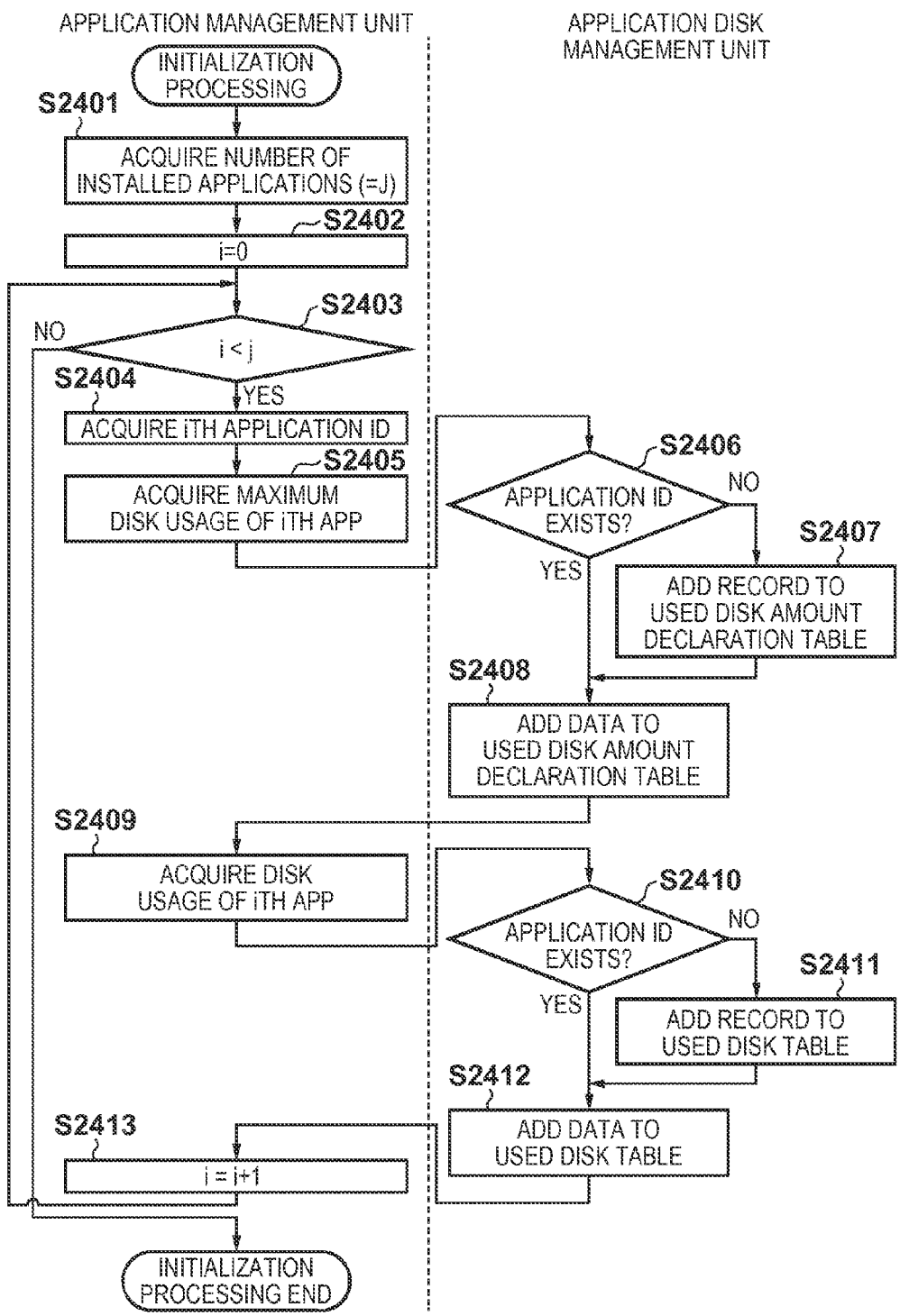
FIG. 23 is a flowchart at the time of startup according to the fourth embodiment.

Next, initialization processing of the application management unit 308 when the application platform 205 of the present embodiment is started up will be described, with reference to FIG. 23. The processing that is described hereinafter is realized by the CPU 101 reading out a control program stored in the ROM 102 or the external storage device 104 to the RAM 103 and executing the control program.

When the application platform 205 is started, the application management unit 308, in S2401, acquires the number of installed applications. The application management unit 308 initializes a variable i to 0 in S2402, compares the variable i with a number j of the applications in S2403, transitions to S2404 if i<j, and ends the processing if this is not the case, having judged that processing which will be discussed later has been performed for all the applications. In S2404, the application management unit 308 acquires the application ID, and, at S2405, acquires the disk usage declared by the application. The application disk management unit 2001 is then called.

In S2406, the application disk management unit 2001 determines whether a corresponding application ID is registered in the used disk amount declaration table, and, if not registered, add a record at S2407 and transitions to S2408. On the other hand, if registered, the processing advances directly to S2408. In S2408, the application disk management unit 2001 ties together the data of the application ID 2201 and the maximum usage 2202 and adds this data to the used disk amount declaration table 2003, before returning the processing to the application management unit 308.

Next, in S2409, the application management unit 308 acquires the capacity under the folder in which the application is installed, and calls the application disk management unit 2001 again. In S2410, the application disk management unit 2001 determines whether a corresponding application ID is registered in the used disk table, and, if not registered, adds a record at S2411 and transitions to S2412. On the other hand, if registered, the processing advances directly to S2412. In S2412, the application disk management unit 2001 ties together the data of the application ID 2101 and the usage 2102 and adds this data to the used disk table 2002, before returning the processing to the application management unit 308. In S2413, the application management unit 308 increments the variable and returns to the determination of S2403.

Note that, when an application is newly installed, the application management unit 308 installs the application in a predetermined folder of the external storage device 104. It should be obvious that, thereafter, similar processing to this flowchart is performed, and that information is added to the used disk amount declaration table 2003 and the used disk table 2002. Furthermore, when uninstalling an application, the application management unit 308 deletes the folder in which the application is installed. It should be obvious that information relating to the application is deleted from the used disk amount declaration table 2003 and the used disk table 2002 at this time.

The processing of this flowchart enables management of disk usage in a start-up initialization state of an application that is managed by the application management unit 308, when starting up the application management apparatus 100 serving as an image processing apparatus.

Object Generation Processing

Figure 24:
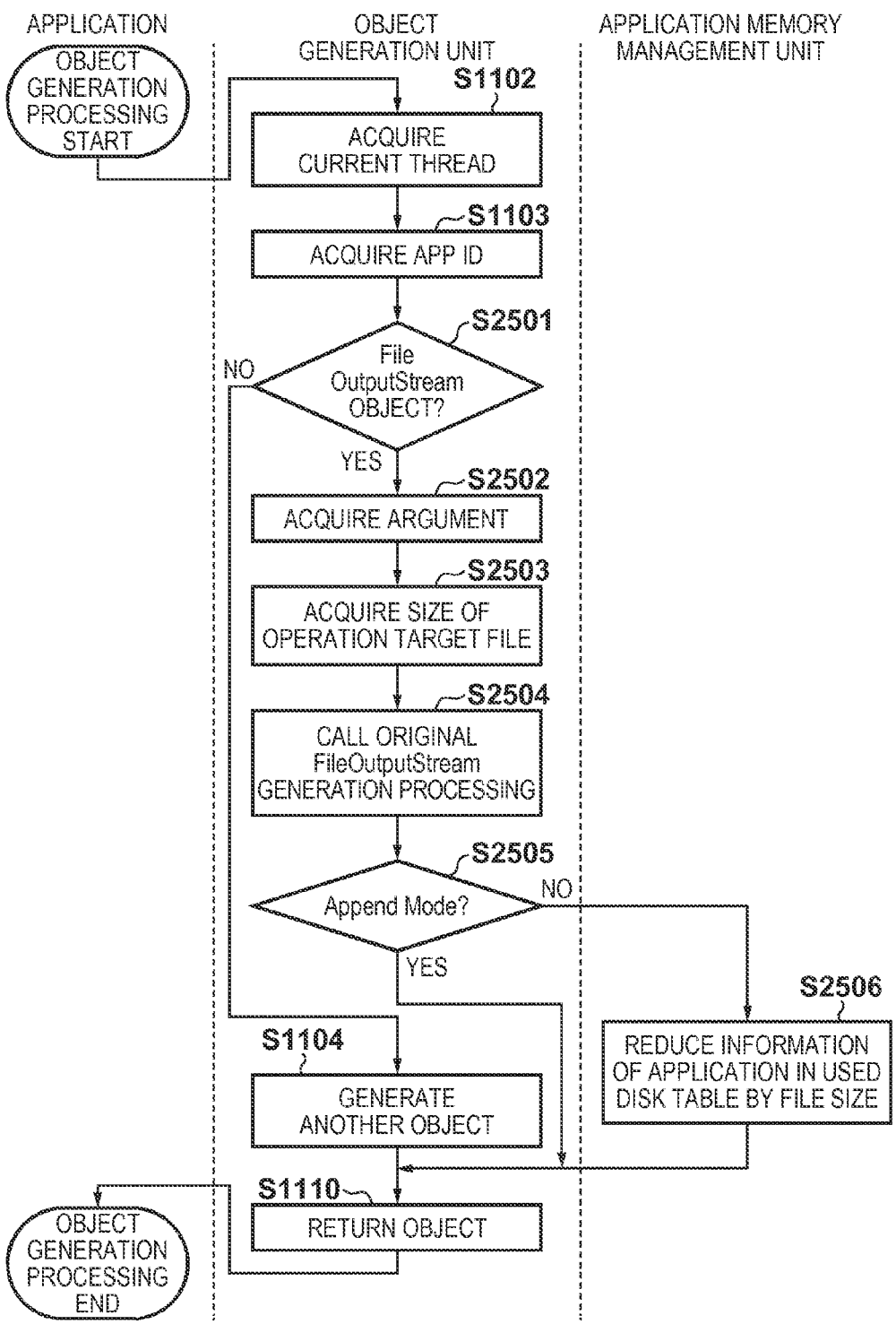
FIG. 24 is a flowchart at the time of FileOutputStream object generation.

FIG. 24 is a flowchart when a FileOutputStream object for performing generation and writing of a file is generated. The processing that is described hereinafter is realized by the CPU 101 reading out a control program stored in the ROM 102 or the external storage device 104 to the RAM 103 and executing the control program. Here, portions that are different from the controls of FIG. 11 described in the first embodiment will be described.

When an application ID is acquired at S1103, the object generation unit 303, in S2501, determines whether the object to be generated is FileOutputStream. The processing advances to S2502 if FileOutputStream, and advances to S1104 in the case of generation of another object.

In S2502, the object generation unit 303 acquires an argument for generating a FileOutputStream object, and, in S2503, acquires the file size of the operation target from the acquired argument. Then, in S2504, the object generation unit 303 calls processing for generating the original FileOutputStream object. Then, in S2505, the object generation unit 303 determines whether the FileOutputStream object is being generated in Append Mode, based on the argument acquired at S2502 or the method of generating the object. The specification of the FileOutputStream object in Java is to operate so as to add data to the end of an existing file if Append Mode, and so as to return the file size to 0 and perform rewriting if this is not the case. If the determination result indicates Append Mode, the processing advances to S1110.

On the other hand, if not Append Mode, it is judged that the file size of the operation target is 0, and the processing transitions to S2506. In S2506, the application disk management unit 2001 subtracts the size acquired at S2503 from the usage 2102 of the current application in the used disk table 2002, returns the processing to the object generation unit 303, and transitions to S1110.

In S1110, the object generation unit 303 returns the processing to the application, and the application ends the object generation processing.

Write Method of FileOutputStream Object

Figure 25:
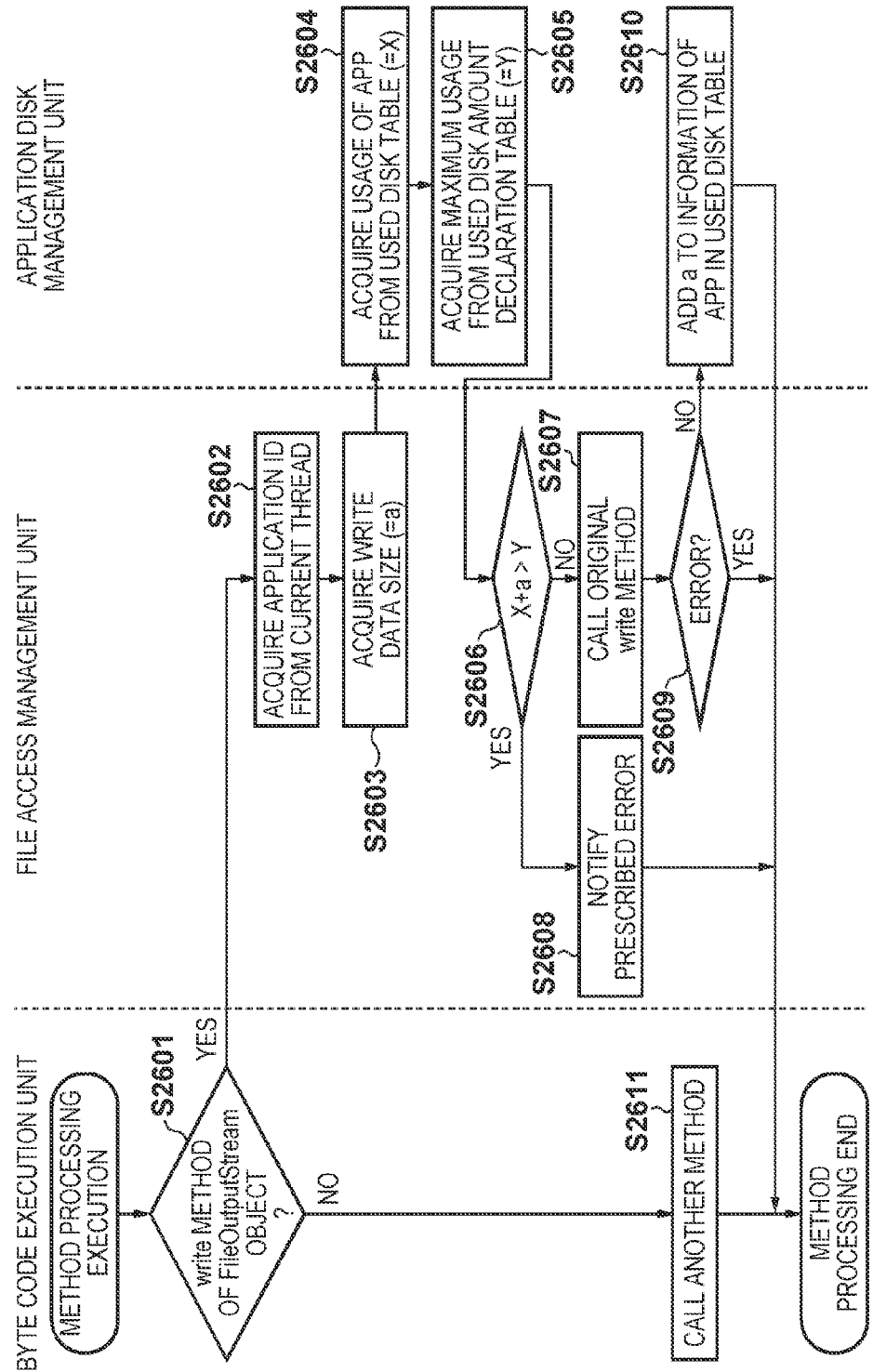
FIG. 25 is a flowchart at the time of execution of a FileOutputStream object write method.

Next, the processing procedure when the application 206 calls the write method of a FileOutputStream object will be described, with reference to FIG. 25. The processing that is described hereinafter is executed during the processing of S905 in FIG. 9 and FIG. 15. Also, the processing that is described hereinafter is realized by the CPU 101 reading out a control program stored in the ROM 102 or the external storage device 104 to the RAM 103 and executing the control program. At the time of execution, the processing of the access controller 2005 of the file access management unit 2004 is called by the byte code execution unit 301.

In S2601, the byte code execution unit 301 determines whether the method is the write method of a FileOutputStream object. If the method is the write method of a FileOutputStream object, the processing advances to S2602, and if this is not the case, the processing of another method is called at S2611, and the current processing is ended.

In executing the write method, the file access management unit 2004, in S2602, reads the application ID field 802 of the thread structure of the current thread. Then, in S2603, the file access management unit 2004 acquires the size (=a) of the write data passed to the write method, and passes the processing to the application disk management unit 2001.

Next, in S2604, the application disk management unit 2001 uses the application ID acquired at S2602, and acquires the usage 2102 (=X) of the application from the used disk table 2002. Furthermore, in S2605, the application disk management unit 2001 acquires the maximum usage 2202 (=Y) from the used disk amount declaration table 2003, and returns the processing to the file access management unit 2004.

In S2606, the file access management unit 2004 determines whether the size obtained by adding the usage X of the application to the write data size a exceeds the maximum usage Y. If the maximum usage Y is exceeded, the processing transitions to S2608, and the file access management unit 2004 judges that the writing to be performed exceeds the maximum usage 2202 declared by the application 206, notifies a predetermined error (disk error), and ends the current processing.

If the maximum usage Y is not exceeded, the processing advances to S2607, and the file access management unit 2004 calls the original write method, and executes writing of the file. Thereafter, in S2609, the file access management unit 2004 determines whether writing of the file failed. The processing is ended if writing of the file failed, and the processing is passed to the application disk management unit 2001 and transitions to S2610 if writing of the file was successful. In S2610, the application disk management unit 2001 adds the write data size (=a) to the usage 2102 of the application in the used disk table 2002, and ends the processing.

Java has a FileWriter class that is similar to FileOutputStream. Since the FileWriter class can be supported if used by adopting the same configuration as FileOutputStream, description thereof will be omitted in the present embodiment.

setLength Method of RandomAccessFile Object

Figure 26:
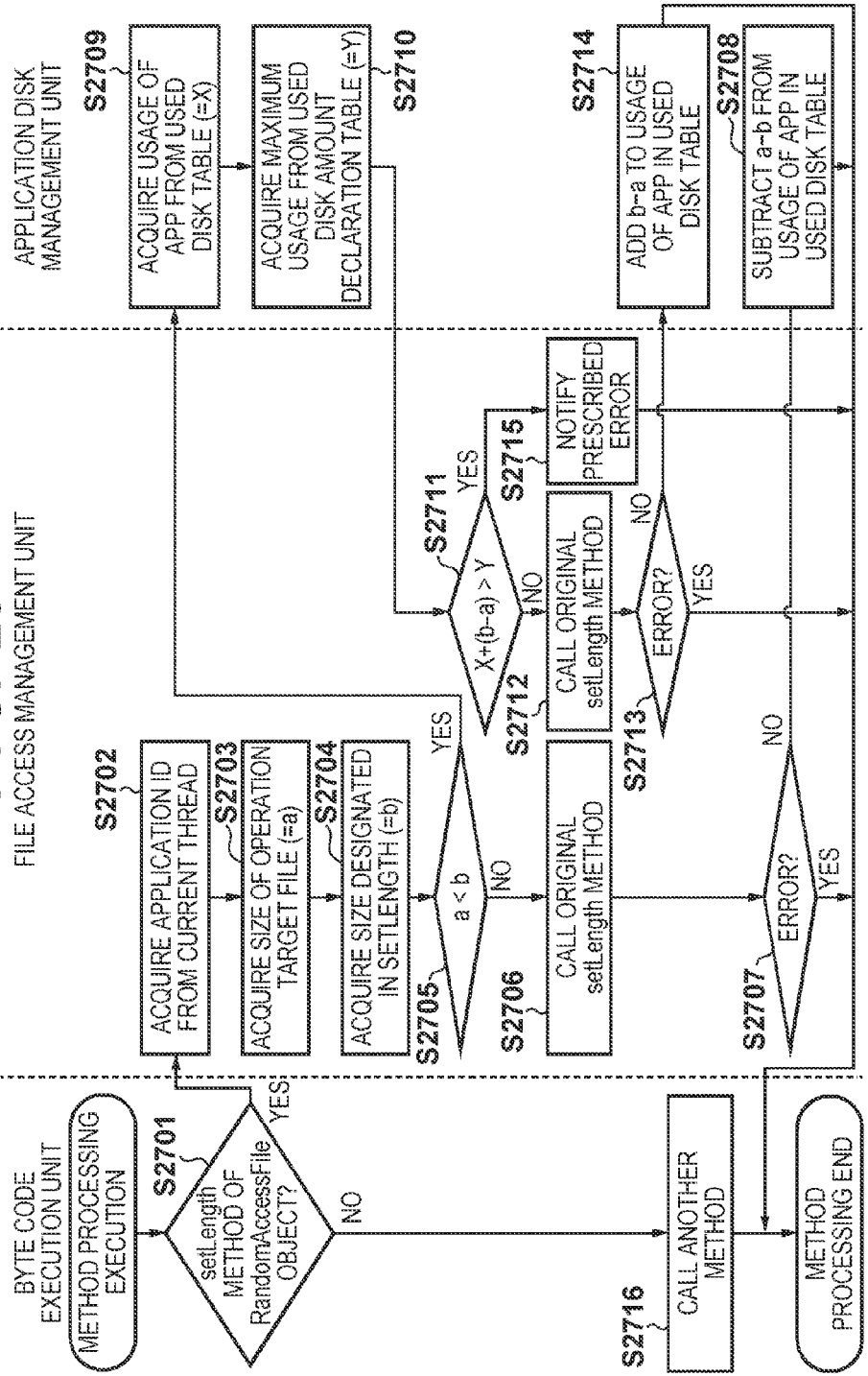
FIG. 26 is a flowchart at the time of execution of a RandomAccessFile object setLength method.

Next, the processing procedure when the application 206 calls the setLength method of a RandomAccessFile object will be described, with reference to FIG. 26. The processing that is described hereinafter is executed during the processing of S905 in FIG. 9 and FIG. 15. Also, the processing that is described hereinafter is realized by the CPU 101 reading out a control program stored in the ROM 102 or the external storage device 104 to the RAM 103 and executing the control program. At the time of execution, the processing of the access controller 2005 of the file access management unit 2004 is called by the byte code execution unit 301. The setLength specification of the RandomAccessFile object in Java is to operate so as to change the file size of the operation target to a size designated by setLength.

In S2701, the byte code execution unit 301 determines whether the method is the setLength method of a RandomAccessFile object. If the method is the setLength method of a RandomAccessFile object, the processing transitions to S2702, and if this is not the case, the processing transitions to S2716 and the processing of another method is called, after which the current processing is ended.

In executing the setLength method, the file access management unit 2004, in S2702, reads the application ID field 802 of the thread structure of the current thread. Then, in S2703, the file access management unit 2004 acquires the size (=a) of the target file of the setLength method, and, at S2704, acquires the size (=b) designated in the setLength method. Thereafter, in S2705, the file access management unit 2004 compares a and b, and transitions to S2709 if b is larger, that is, if the file size is larger. If this is not the case, the file access management unit 2004 transitions to S2706, calls the original setLength method, and determines the execution result of the setLength method at S2707. If successful, the processing transitions to S2708, and if not successful, the processing is ended. In S2708, the application disk management unit 2001 subtracts the value derived by a−b from the usage 2102 of the application in the used disk table 2002, and ends the processing.

On the other hand, if it is determined at S2705 that the file size is larger, the application disk management unit 2001, in S2709, acquires the disk usage 2102 (=X) of the application ID acquired at S2701. Then, in S2710, the application disk management unit 2001 acquires the maximum usage 2202 (=Y). Then, in S2711, the file access management unit 2004 determines whether the increase in the current usage X resulting from the setLength method exceeds the maximum usage Y (X+(b−a)>Y).

If the maximum usage Y is exceeded, the processing transitions to S2715, and the file access management unit 2004 judges that the writing to be performed will exceed the maximum usage 2202 declared by the application 206, notifies a predetermined error, and ends the current processing. On the other hand, the processing transitions to S2712 if it is judged that the maximum usage Y is not exceeded, and the file access management unit 2004 calls the original setLength method. Then, in S2713, the file access management unit 2004 determines the execution result of the setLength method, and transitions to S2714 if successful. In S2714, the application disk management unit 2001 adds a value derived by b−a to the usage 2102 of the application in the used disk table 2002, and ends the processing. On the other hand, the processing is ended if it is determined at S2713 that the execution result is an error.

Write Method of RandomAccessFile Object

Figure 27:
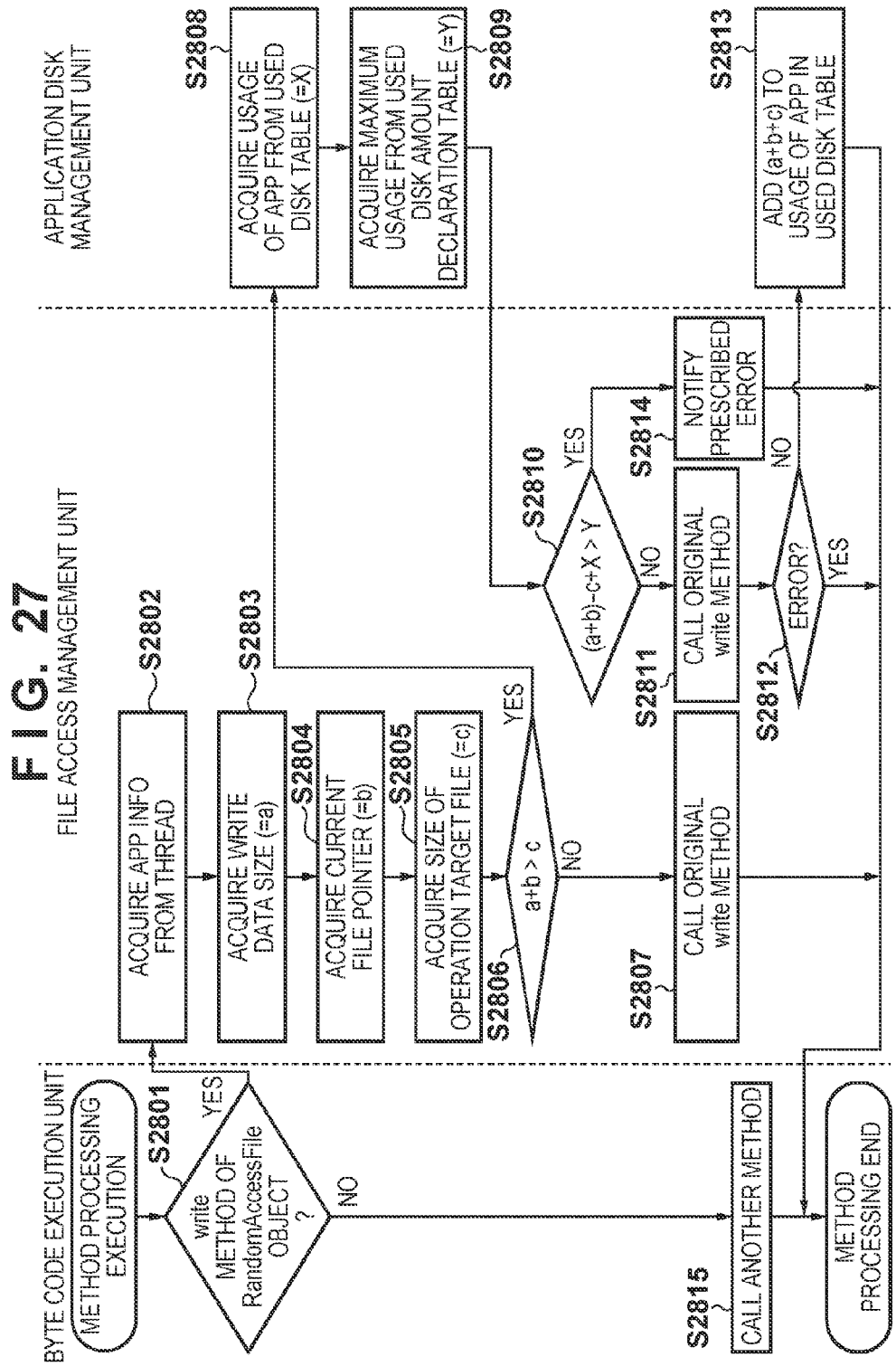
FIG. 27 is a flowchart at the time of execution of a RandomAccessFile object write method.

Next, the processing procedure when the application 206 calls the write method of a RandomAccessFile object will be described, with reference to FIG. 27. The processing that is described hereinafter is executed during the processing of S905 in FIG. 9 and FIG. 15. Also, the processing that is described hereinafter is realized by the CPU 101 reading out a control program stored in the ROM 102 or the external storage device 104 to the RAM 103 and executing the control program. At the time of execution, the processing of the access controller 2005 of the file access management unit 2004 is called by the byte code execution unit 301. The write specification of the RandomAccessFile object in Java is to operate so as to write data from the position of a file pointer of the file that is the operation target. At this time, the write specification is to operate such that the file size increases if the write size exceeds the file size.

In S2801, the byte code execution unit 301 determines whether the method is the write method of a RandomAccessFile object. If the method is the write method of a RandomAccessFile object, the processing advances to S2802, and if this is not the case, the processing of another method is called at S2815, and current processing is ended.

In executing the write method, the file access management unit 2004, in S2802, reads the application ID field 802 of the thread structure of the current thread. Then, in S2803, the file access management unit 2004 acquires the size (=a) of the write data passed to the write method, and, at S2804, acquires the current position (=b) of the file pointer. Furthermore, at S2805, the file access management unit 2004 acquires the size (=c) of the operation target file. Thereafter, in S2806, the file access management unit 2004 adds the position of the file pointer b to the write size a, and determines whether the file size will increase (a+b>c). If the file size will increase, the processing transitions to S2808, and if this is not the case, the original write method is called at S2807, and since the file size does not change, the current processing is ended.

In S2808, the application disk management unit 2001 acquires the disk usage 2102 (=X) of the application ID acquired at S2801, acquires the maximum usage 2202 (=Y) at S2809, and transitions to S2810. In S2810, the file access management unit 2004 determines whether the increase in the current usage X resulting from the write method exceeds the maximum usage Y ((a+b)−c+X>Y). If the maximum usage Y is exceeded, the processing transitions to S2814, and the file access management unit 2004 judges that the writing to be performed exceeds the maximum usage 2202 declared by the application 206, notifies a predetermined error, and ends the current processing.

On the other hand, if it is judged that the maximum usage Y is not exceeded, the processing transitions to S2811, and the file access management unit 2004 calls the original write method. Thereafter, in S2812, the file access management unit 2004 determines the execution result of the write method. If successful, the processing transitions to S2813, and the application disk management unit 2001 adds a value derived by a+b−c to the usage 2102 of the application in the used disk table 2002, and ends the processing. On the other hand, this processing is ended if it is determined at S2811 that the write method was not successfully executed.

Delete Method of File Object

Figure 28:
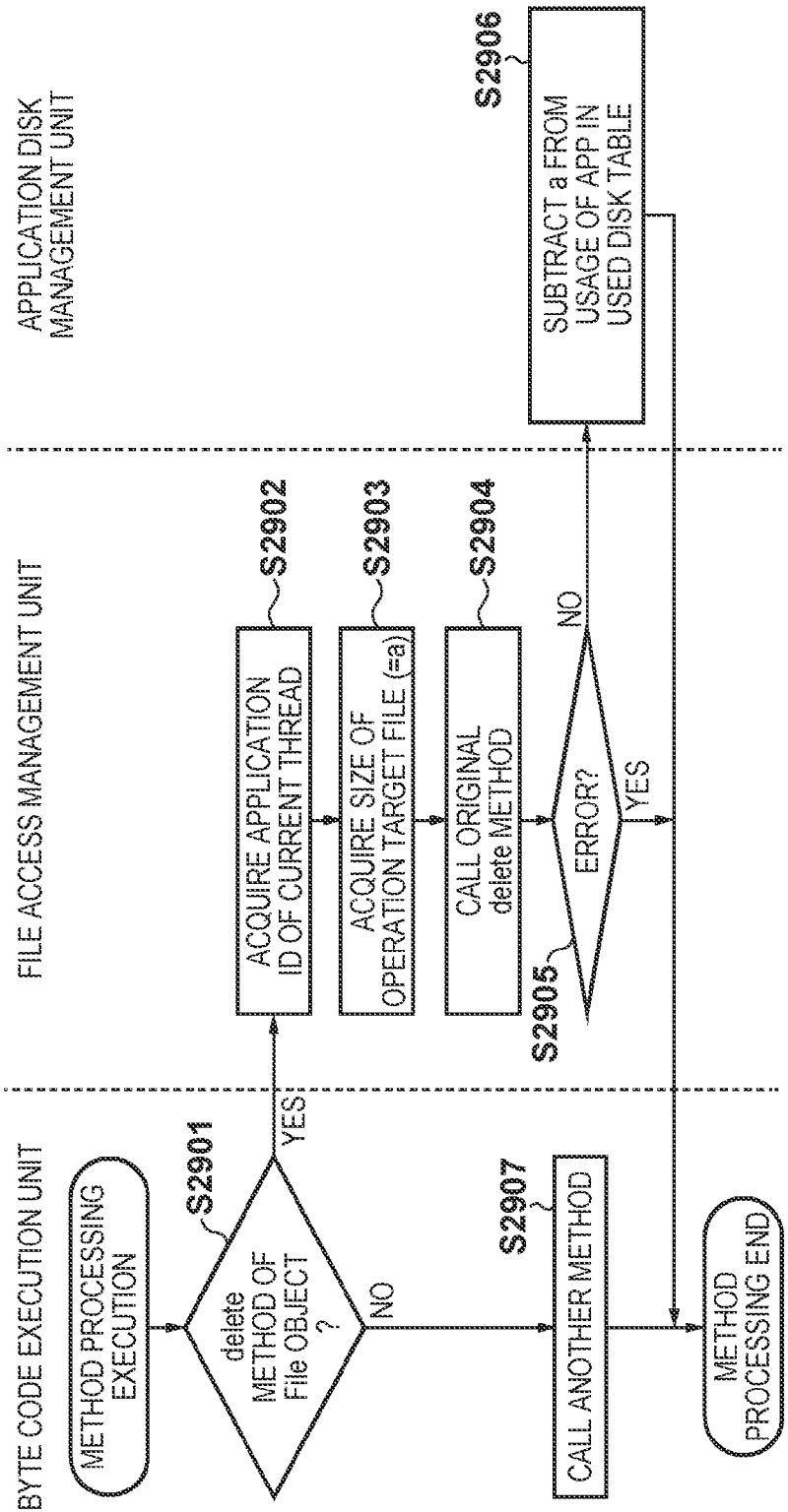
FIG. 28 is a flowchart at the time of execution of a File object delete method.

Next, the processing procedure when the application 206 calls the delete method of a File object will be described, with reference to FIG. 28. The processing that is described hereinafter is executed during the processing of S905 in FIG. 9 and FIG. 15. Also, the processing that is described hereinafter is realized by the CPU 101 reading out a control program stored in the ROM 102 or the external storage device 104 to the RAM 103 and executing the control program.

In S2901, the byte code execution unit 301 determines whether the method is the delete method of a File object. If the method is the delete method of a File object, the processing transitions to S2902, and if this is not the case, the processing transitions to S2907 and the processing of another method is called, after which the current processing is ended.

In S2902, the file access management unit 2004, in executing the delete method, reads the application ID field 802 of the thread structure of the current thread. Then, in S2903, the file access management unit 2004 acquires the size (=a) of the target file of the delete method, and calls the original delete method at S2904.

In S2905, the file access management unit 2004 determines the execution result of the delete method, and ends the current processing if it is determined that the delete method was not successfully executed. On the other hand, the processing transitions to S2906 if the delete method was successfully executed. In S2906, the application disk management unit 2001 subtracts the file size a of the operation target from the usage 2102 of the application in the used disk table 2002, and ends the processing.

Note that, in the present embodiment, if the maximum usage declared by the application 206 is exceeded, a predetermined error is notified (S2608, S2715, S2814). The application management unit 308 can also be constituted so as to stop a corresponding application if this notification is detected.

As described above, the image processing apparatus according to the present embodiment reads the class file of the class of an application, in response to an application start-up request, adds code for recording application information indicating the application at the beginning of a method that is included in the read class file, and loads the class. Furthermore, this image processing apparatus, during execution of the method, allocates the file size to be used for an object to be generated and records application information recorded in the thread with the allocated file size as disk usage, together with generating the object, and tying together and managing application information of the generated object and disk usage. In the present embodiment, similar effects to the first to third embodiments can thereby also be obtained with regard to disk usage.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-120103 filed on Jun. 6, 2013, which is hereby incorporated by reference herein in its entirety.

What is claimed is:

1. An image processing apparatus comprising at least an application control unit and a system control unit, wherein:
  the application control unit comprises:
    a control unit configured to, in response to a start-up request for an application, read a class file of a class of the application, and load the class;
  the system control unit comprises:
    an object generation unit configured to load the class, allocate memory to be used for an object to be generated, and generate the object with recording application information recorded in a thread to the allocated memory,
  wherein the application control unit further comprises:
    a memory management unit configured to associate the application, for which the start-up request was accepted, with a memory which was used for starting the application, and to manage the associated application and memory,
  wherein the system control unit treats a plurality of applications as one application, and in a case where there are a plurality of objects generated by the object generation unit, each object is associated with a corresponding application which has been used.

2. The image processing apparatus according to claim 1, wherein the control unit is configured to further add, at an end of the method included in the read class file, code for deleting application information recorded in the thread.

3. The image processing apparatus according to claim 1, wherein in a case where a plurality of applications operate cooperatively, the application information that is recorded in the thread has a stack structure.

4. The image processing apparatus according to claim 1, further comprising:
  a table in which the application information and memory size that is available to the application are tied together and defined;
  a determination unit configured to determine, when memory for generating an object has been allocated by the object generation unit, whether a sum total of a memory size being used by an application corresponding to the application information managed by the memory management unit and a size of the allocated memory exceeds the corresponding available memory size; and
  a restriction unit configured to generate a memory error when it is determined by the determination unit that the sum total exceeded the available memory size.

5. An image processing apparatus comprising at least an application control unit and a system control unit, wherein:
the application control unit comprises:
a control unit configured to, in response to a start-up request for an application, read a class file of a class of the application and load the class;
the system control unit comprises:
an object generation unit configured to load the class, allocate a file size to be used for an object to be generated and generate the object with recording application information recorded in a thread with the allocated file size as disk usage, together with generating the object,
the application control unit further comprises:
a disk management unit configured to associate the application, for which the start-up request was accepted, with a disk which was used for starting the application, and to manage the associated application and disk,
wherein the system control unit treats a plurality of applications as one application, and in a case where there are a plurality of objects generated by the object generation unit, each object is associated with a corresponding application which has been used.

6. The image processing apparatus according to claim 5, wherein the control unit is configured to further add, at an end of the method included in the read class file, code for deleting application information recorded in the thread.

7. The image processing apparatus according to claim 5, wherein in a case where a plurality of applications operate cooperatively, the application information that is recorded in the thread has a stack structure.

8. The image processing apparatus according to claim 5, further comprising:
a table in which the application information and disk usage that is available to the application are tied together and defined;
a determination unit configured to determine, when a file size for generating an object has been allocated by the object generation unit, whether a sum total of disk usage being used by an application corresponding to the application information managed by the disk management unit and the allocated file size exceeds the corresponding available disk usage; and
a restriction unit configured to generate a disk error when it is determined by the determination unit that the sum total exceeded the available disk usage.

9. A method for controlling an image processing apparatus comprising at least an application control unit and a system control unit, the method comprising:
performing, in the application control unit, in response to a start-up request for an application, reading of a class file of a class of the application, and loading of the class;
performing, in the system control unit allocation of memory to be used for an object to be generated and generating the object with recording application information recorded in a thread to the allocated memory; and
performing, in the application control unit, association of the application, for which the start-up request was accepted, with a memory which was used for starting the application, and managing the associated application and memory,
wherein the system control unit treats a plurality of applications as one application, and in a case where there are a plurality of generated objects, each object is associated with a corresponding application which has been used.

10. A method for controlling an image processing apparatus comprising at least an application control unit and a system control unit, the method comprising:
performing, in the application control unit, in response to a start-up request for an application, reading of a class file of a class of the application, and loading of the class;
performing, in the system control unit, allocation of a file size to be used for an object to be generated and generating the object with recording application information recorded in a thread with the allocated file size as disk usage, together with generation of the object; and
performing, in the application control unit, association of the application, for which the start-up request was accepted, with a disk which was used for starting the application, and managing the associated application and disk,
wherein the system control unit treats a plurality of applications as one application, and in a case where there are a plurality of generated objects, each object is associated with a corresponding application which has been used.

11. A non-transitory computer-readable storage medium storing a computer program for causing a computer to execute a method for controlling an image processing apparatus comprising at least an application control unit and a system control unit the method comprising:
performing, in the application control unit, in response to a start-up request for an application, reading of a class file of a class of the application, and loading of the class;
performing, in the system control unit, allocation of memory to be used for an object to be generated and generating the object with recording application information recorded in a thread to the allocated memory; and
performing, in the application control unit, association of the application, for which the start-up request was accepted, with a memory which was used for starting the application, and managing the associated application and memory,
wherein the system control unit treats a plurality of applications as one application, and in a case where there are a plurality of generated objects, each object is associated with a corresponding application which has been used.

12. A non-transitory computer-readable storage medium storing a computer program for causing a computer to execute a method for controlling an image processing apparatus comprising at least an application control unit and a system control unit, the method comprising:
performing, in the application control unit, in response to a start-up request for an application, reading of a class file of a class of the application, and loading of the class;
performing, in the system control unit, allocation of a file size to be used for an object to be generated and generating the object with recording application information recorded in a thread with the allocated file size as disk usage, together with the generation of the object and;
performing, in the application control unit, association of the application, for which the start-up request was accepted, with a disk which was used for starting the application, and managing the associated application and disk,
wherein the system control unit treats a plurality of applications as one application, and in a case where there are a plurality of generated objects, each object is associated with a corresponding application which has been used.

* * * * *